United States Patent
Takenaka et al.

(10) Patent No.: US 7,860,613 B2
(45) Date of Patent: Dec. 28, 2010

(54) LEGGED MOBILE ROBOT AND CONTROL PROGRAM FOR THE ROBOT

(75) Inventors: Toru Takenaka, Wako (JP); Takashi Matsumoto, Wako (JP); Takahide Yoshiike, Wako (JP); Kazushi Akimoto, Wako (JP); Shinya Shirokura, Wako (JP); Minami Asatani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 611 days.

(21) Appl. No.: 11/718,054

(22) PCT Filed: Sep. 14, 2005

(86) PCT No.: PCT/JP2005/016891

§ 371 (c)(1),
(2), (4) Date: Apr. 26, 2007

(87) PCT Pub. No.: WO2006/064598

PCT Pub. Date: Jun. 22, 2006

(65) Prior Publication Data

US 2008/0300721 A1     Dec. 4, 2008

(30) Foreign Application Priority Data

Dec. 14, 2004   (JP) ............................. 2004-362091

(51) Int. Cl.
*B25J 5/00*      (2006.01)
(52) U.S. Cl. .................. 700/253; 901/1; 318/568.11; 318/568.12
(58) Field of Classification Search ............. 700/245, 700/253; 901/1; 318/568.11–568.2
See application file for complete search history.

(56) References Cited

U.S. PATENT DOCUMENTS

| | | | |
|---|---|---|---|
| 5,644,204 A | | 7/1997 | Nagle |
| 5,808,433 A | * | 9/1998 | Tagami et al. .......... 318/568.12 |
| 2003/0114960 A1 | * | 6/2003 | Takenaka et al. ............ 700/245 |
| 2004/0044440 A1 | * | 3/2004 | Takenaka .................... 700/245 |
| 2005/0021176 A1 | * | 1/2005 | Takenaka et al. ............ 700/245 |
| 2005/0075755 A1 | * | 4/2005 | Takenaka et al. ............ 700/245 |
| 2005/0173164 A1 | * | 8/2005 | Maslov et al. ................ 180/8.1 |

FOREIGN PATENT DOCUMENTS

EP       0488692      6/1992

(Continued)

*Primary Examiner*—Khoi Tran
*Assistant Examiner*—Rodney King
(74) *Attorney, Agent, or Firm*—Rankin, Hill & Clark LLP

(57) ABSTRACT

A legged mobile robot which permits improved follow-up of an actual floor reaction force to a desired floor reaction force and which can be stably controlled is provided.

According to a robot 1 in accordance with the present invention, a deformation amount (mechanism deformation amount) of a compliance mechanism 42 that occurs due to a desired floor reaction force of a foot (ground contacting portion) 22 is determined, and the operation of a leg 2 is controlled such that the foot 22 lands onto a floor at a predetermined velocity in a vertical direction or in a direction perpendicular to the floor surface on the basis of a component of the mechanism deformation amount in the vertical direction or a component thereof in the direction perpendicular to the floor surface.

20 Claims, 17 Drawing Sheets

FOREIGN PATENT DOCUMENTS

| | | |
|---|---|---|
| EP | 1466705 | 10/2004 |
| JP | 02-048283 | 2/1990 |
| JP | 05-324115 | 12/1993 |
| JP | 10-086080 | 4/1998 |
| JP | 10-086081 | 4/1998 |
| JP | 10-277969 | 10/1998 |
| JP | 2000-352011 | 12/2000 |
| JP | 2001-322076 | 11/2001 |

* cited by examiner

(RUNNING GAIT)

(DESIRED FLOOR REACTION FORCE VERTICAL COMPONENT)

(FLOWCHART OF PROCESSING FOR GENERATING GAIT)

(PROCESSING FOR DETERMINING NORMAL GAIT PARAMETER)

(PERMISSIBLE RANGE OF FLOOR REACTION FORCE HORIZONTAL COMPONENT)

(PERMISSIBLE RANGE OF FLOOR REACTION FORCE HORIZONTAL COMPONENT)

PERMISSIBLE LOWER LIMIT VALUE Fxmin OF FLOOR REACTION FORCE HORIZONTAL COMPONENT
AND PERMISSIBLE UPPER LIMIT VALUE Fxmax OF FLOOR REACTION FORCE HORIZONTAL COMPONENT (DESIRED FLOOR REACTION FORCE VERTICAL COMPONENT IN WALKING MODE)

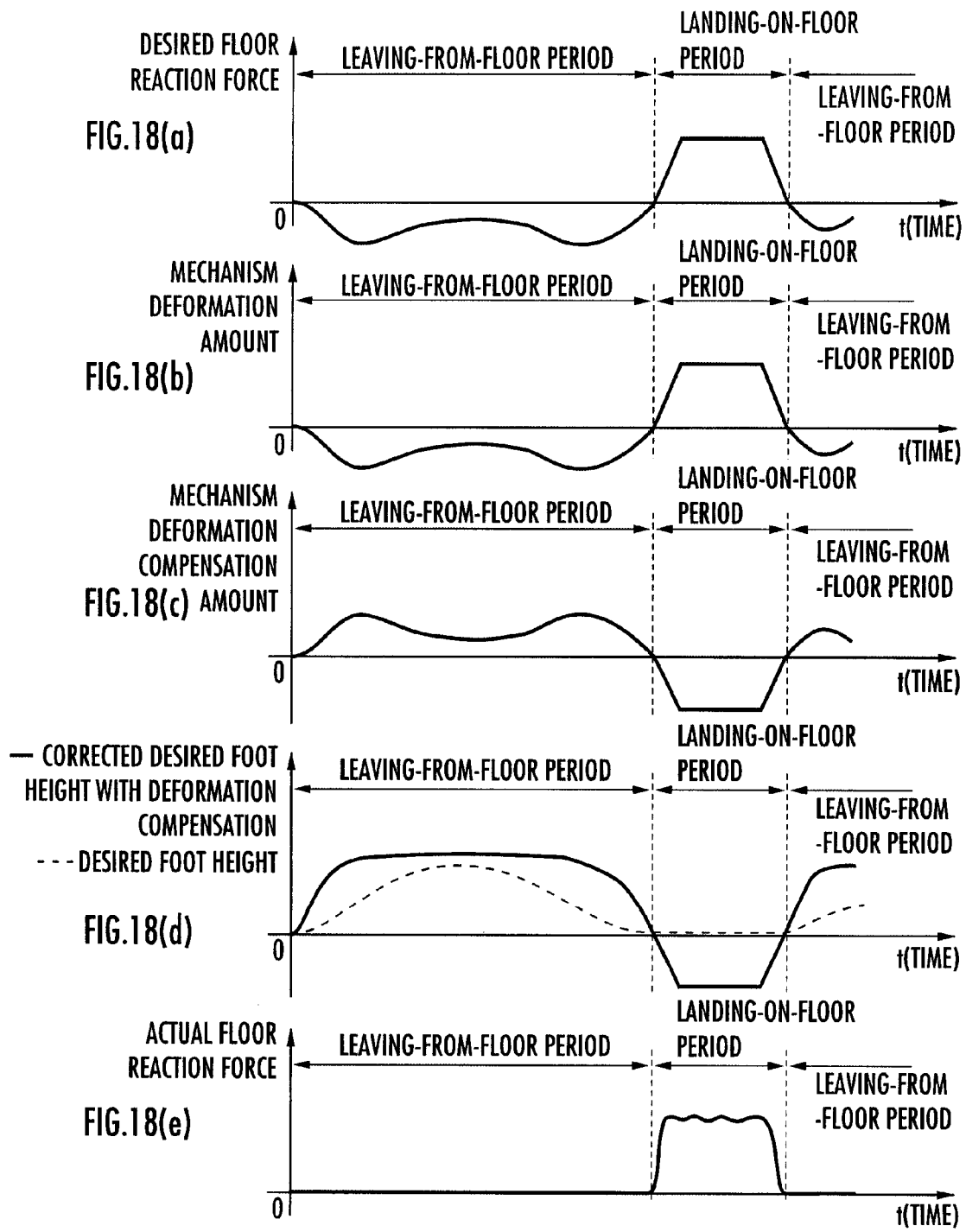

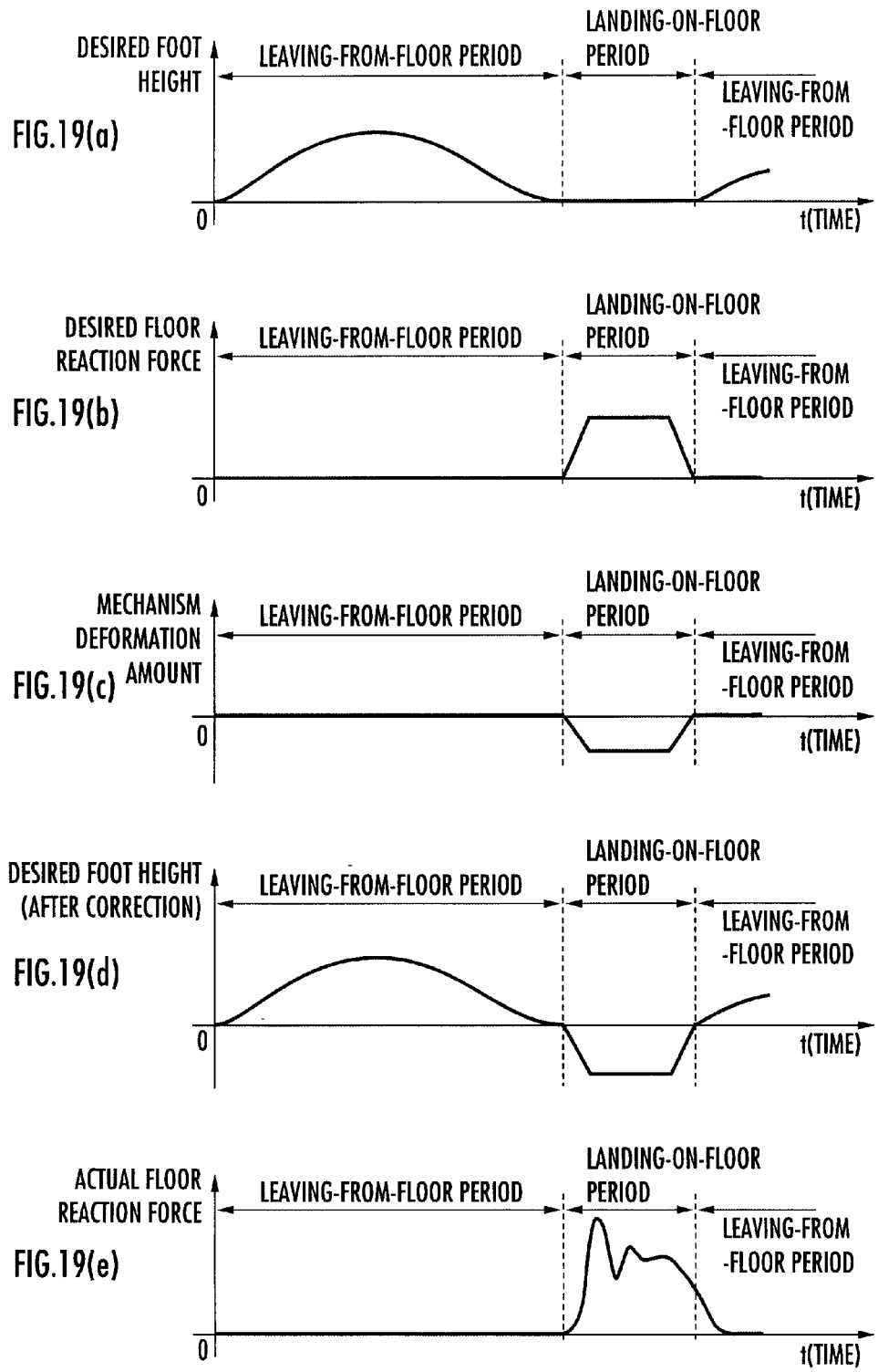

LEGGED MOBILE ROBOT AND CONTROL PROGRAM FOR THE ROBOT

TECHNICAL FIELD

The present invention relates to a legged mobile robot and a control program for the same.

BACKGROUND ART

Hitherto, there has been proposed a technical approach for controlling an operation of a leg when a robot travels such that a vertical component of the velocity of a foot approximates zero before landing so as to ease an impact to the leg and the like when the foot lands on a floor. With this arrangement, when, for example, a bipedal mobile robot runs by repeating a floating period during which both legs are in the air and a one-leg supporting period during which the robot is supported by one of the legs, a desired foot height of the right foot is set such that it reaches zero immediately before the floating period is switched to the one-leg supporting period, as shown in FIG. 19(a).

There has been proposed another technical approach in which a compliance mechanism for reducing an impact to a leg and the like when a foot lands on a floor is provided, and a desired trajectory of a foot is set, considering the deformation of the compliance when a foot lands on a floor. With this arrangement, if, for example, while the bipedal mobile robot is running, a desired floor reaction force suddenly increases from zero immediately after the floating period is switched to the one-leg supporting period and maintained at a constant value thereafter, and then suddenly decreases to zero immediately before the next floating period, as shown in FIG. 19(b), then the amount of deformation of the compliance mechanism attributable to the desired floor reaction force is predicted to change as shown in FIG. 19(c). Further, the desired foot height shown in FIG. 19(a) is corrected and reset as shown in FIG. 19(d) so as to compensate for the amount of deformation.

However, if, for example, the desired foot height (desired foot trajectory) as shown in FIG. 19(d) is set, then an inconvenience described below will occur.

Immediately after a leg moves to a ground-contacting period, an actual floor reaction force starts to develop with a delay with respect to a desired floor reaction force, as shown in FIG. 19(e), leading to a danger in that a foot is not adequately decelerated and the actual floor reaction force and eventually an impact to the robot at landing temporarily become excessive.

In addition, a time delay may take place in the deformation of the compliance mechanism due to a response delay of an actuator acting as a motor of a leg, a transmission delay in a driving force transmission system, and a response delay due to a deflection in a leg mechanism, leading to a possibility of deterioration in follow-up of an actual floor reaction force acting on a foot (=a floor reaction force measured by a 6-axis force sensor or the like provided on a foot joint) to a desired floor reaction force. For instance, as shown in FIG. 19(e), if an actual floor reaction force acting on a foot changes with a delay in relation to the desired floor reaction force shown in FIG. 19(b) after the foot shifts from a non-ground-contacting period to a ground-contacting period, then a finite actual floor reaction force may remain (unloading may deteriorate) despite that the actual floor reaction force should have been zero because of the foot having left a floor as the period shifted to the next non-ground-contacting period. This may cause a toe or the like of the foot to be caught on a floor surface, leading to a possibility of a motion of the robot being disturbed at least temporarily thereafter.

Accordingly, an object of the present invention is to provide a legged mobile robot that permits improved follow-up of an actual floor reaction force to a desired floor reaction force and stable control of a motion thereof, and a control program for the same.

DISCLOSURE OF INVENTION

The present invention relates to a legged mobile robot which is equipped with a base body, a plurality of legs extended downward from the base body, and a compliance mechanism for easing a landing impact to each leg, and which travels by motions of each leg, involving the landing and leaving of a ground contacting portion of a distal end of each leg onto and from a floor.

A legged mobile robot according to a first embodiment of the present invention to fulfill the aforesaid object is equipped with a leg controlling means which controls the operation of the leg such that a ground contacting portion moves downward onto a floor at a predetermined velocity in a vertical direction or in a direction perpendicular to the floor surface.

According to the legged mobile robot of the first embodiment of the present invention, the ground contacting portion moves downward onto a floor at a predetermined velocity in a vertical direction or in a direction perpendicular to the floor surface, allowing an actual floor reaction force to be changed to follow a desired floor reaction force with high follow-up immediately after a shift of a leg from a leaving-from-floor period (non-ground-contacting period) to a landing-on-floor period (ground-contacting period). This makes it possible to obviate a situation in which a load on a leg immediately after the shift to the landing-on-floor period temporarily becomes excessive or a part of a foot is caught on a floor surface due to unsmooth unloading at a shift to the next leaving-from-floor period, as described above, thus permitting stable control of an operation of the robot. In other words, according to the robot of the first embodiment of the present invention, a force with which a leg of the robot in motion firmly stands on a floor surface can be properly controlled from a viewpoint of easing an impact to a leg at the time of landing and preventing a part of a foot of a leg from being caught on a floor at the time of leaving the floor.

Further, the legged mobile robot according to the first embodiment of the present invention includes a desired floor reaction force setting means which sets a desired value of a floor reaction force acting on the ground contacting portion as a desired floor reaction force, wherein the leg controlling means controls the operation of a leg such that the predetermined velocity takes a ratio falling within a range of [0.1, 10] relative to the absolute value of a change rate of the amount of deformation of the compliance mechanism in the vertical direction or the direction perpendicular to the floor surface, the deformation occurring immediately after the landing of the ground contacting portion of the leg due to the desired floor reaction force set by the desired floor reaction force setting means.

The velocity of the ground contacting portion in the vertical direction downward or the direction perpendicular to the floor surface downward with respect to the absolute value of a change rate of the amount of deformation of the compliance mechanism in the vertical direction or the direction perpendicular to the floor surface that occurs immediately after the landing of the ground contacting portion of a leg caused by a desired floor reaction force is a factor influencing an impact to a leg at the time of landing on a floor and unloading at the time of leaving the floor. The inventor of the present applicant has found that, if the rate is below "0.1," the capability for reducing an impact to a leg at the time of landing on the floor suddenly deteriorates and unloading at the time of leaving the floor also deteriorates, leading to a sudden increase in the possibility of a part of the ground contacting portion being caught on the floor surface. On the other hand, if the rate exceeds "10," the possibility of a load on a leg at the time of landing on the floor exceeding, although temporarily, a maximum value of a desired floor reaction force, whereas unloading at the time of leaving the floor is smooth. Accordingly, based on the findings, the operation of a leg is controlled such that the rate falls within [0.1, 10], thereby permitting smooth unloading at the time of leaving the floor while easing an impact to the leg when landing on the floor. This makes it possible to stably control the operation of the robot.

Further, the legged mobile robot according to the first embodiment of the present invention is equipped with a desired floor reaction force setting means which sets a desired value of a floor reaction force acting on the ground contacting portion as a desired floor reaction force, wherein the leg controlling means determines the predetermined velocity on the basis of a change rate of the amount of deformation of the compliance mechanism in the vertical direction or the direction perpendicular to the floor surface, which occurs immediately after the landing of the ground contacting portion of the leg due to the desired floor reaction force set by the desired floor reaction force setting means, and controls the operation of the leg such that the velocity of the ground contacting portion in the vertical direction downward or the direction perpendicular to the floor surface downward reaches the predetermined velocity by the landing.

The legged mobile robot according to the first embodiment of the present invention is equipped with a desired floor reaction force setting means which sets a desired value of a floor reaction force acting on the ground contacting portion as a desired floor reaction force, a mechanism deformation amount determining means which determines the amount of deformation of the compliance mechanism occurring due to a desired floor reaction force set by the desired floor reaction force setting means as a mechanism deformation amount, a desired ground contacting portion trajectory setting means which sets a desired position of a ground contacting portion of a leg as a desired ground contacting portion trajectory, and a desired ground contacting portion trajectory correcting means which corrects the desired ground contacting portion trajectory set by the desired ground contacting portion trajectory setting means so as to compensate for an influence of a mechanism deformation amount determined by the mechanism deformation amount determining means exerted on the desired ground contacting portion trajectory, wherein the leg controlling means controls the motion of a leg such that the velocity of the ground contacting portion in the vertical direction downward or the direction perpendicular to the floor surface downward reaches the predetermined velocity by the landing on the basis of a change rate of a component of the mechanism deformation amount in the vertical direction or a component thereof in the direction perpendicular to a floor surface immediately after the landing of the ground contacting portion determined by the mechanism deformation amount determining means in a leaving-from-floor period of the ground contacting portion, and also controls the motion of the leg on the basis of a corrected desired ground contacting portion trajectory provided by a desired ground contacting portion trajectory correcting means in a landing-on-floor period of the ground contacting portion.

According to the legged mobile robot in accordance with the present invention, the landing velocity of the ground contacting portion is controlled on the basis of the change rate of the component of a mechanism deformation amount in the vertical direction or the component thereof in the direction perpendicular to the floor surface immediately after the ground contacting portion lands on the floor. This makes it possible to smoothly connect the lowering motion of the ground contacting portion of the leg before the end of the leaving-from-floor period to the standing motion of the ground contacting portion of the leg on the floor surface after the start of the landing-on-floor period. In addition, from the aforesaid viewpoint, the force with which a leg of the traveling robot stands on the floor surface is properly controlled according to a landing impact easing characteristic of the compliance mechanism.

Furthermore, in the legged mobile robot according to the first embodiment of the present invention, the desired ground contacting portion trajectory correcting means corrects a component of a desired ground contacting portion trajectory in the vertical direction or a component thereof in the direction perpendicular to a floor surface set by the desired ground contacting portion trajectory setting means such that the component is shifted upward on the basis of a mechanism deformation amount immediately after the ground contacting portion lands, which has been determined by the mechanism deformation amount determining means, in a leaving-from-floor period of the ground contacting portion, while the component is shifted downward on the basis of a mechanism deformation amount set by the mechanism deformation amount determining means in a landing-on-floor period of the ground contacting portion.

According to the legged mobile robot in accordance with the present invention, the desired ground contacting portion trajectory in the landing-on-floor period is corrected downward on the basis of a mechanism deformation amount based on a desired floor reaction force in the landing-on-floor period, while the desired ground contacting portion trajectory in the leaving-from-floor period is corrected upward on the basis of a mechanism deformation amount immediately after the ground contacting portion lands on the floor. This makes it possible to smoothly connect the lowering motion of the ground contacting portion of the leg before the end of the leaving-from-floor period to the standing motion of the ground contacting portion of the leg on the floor surface after the start of the landing-on-floor period. In addition, from the aforesaid viewpoint, the force with which a leg of the traveling robot stands on the floor surface is properly controlled according to a landing impact easing characteristic of the compliance mechanism.

The legged mobile robot according to the first embodiment of the present invention is equipped with a desired floor reaction force setting means which sets a desired value of a floor reaction force acting on a ground contacting portion as a desired floor reaction force, a mechanism deformation amount determining means which determines the amount of deformation of the compliance mechanism occurring due to a desired floor reaction force set by the desired floor reaction force setting means as a mechanism deformation amount, a desired ground contacting portion trajectory setting means which sets a desired position of a ground contacting portion of a leg as a desired ground contacting portion trajectory, and a desired ground contacting portion trajectory correcting means which determines a corrected desired ground contacting portion trajectory by correcting the desired ground contacting portion trajectory set by the desired ground contacting portion trajectory setting means so as to compensate for an influence of a mechanism deformation amount determined by the mechanism deformation amount determining means exerted on the desired ground contacting portion trajectory, wherein the desired floor reaction force setting means sets a desired floor reaction force that turns a component in the vertical direction or a component in the direction perpendicular to a floor surface in a landing-on-floor period of the ground contacting portion to be positive, while the desired floor reaction force setting means sets a virtual desired floor reaction force that turns the component in the vertical direction or the component in the direction perpendicular to a floor surface in a leaving-from-floor period of the ground contacting portion to be negative on the basis of a desired floor reaction force immediately after landing, and the leg controlling means controls the motion of a leg on the basis of a corrected desired ground contacting portion trajectory determined by the desired ground contacting portion trajectory correcting means.

According to the legged mobile robot in accordance with the present invention, a positive mechanism deformation amount is determined on the basis of a positive floor reaction force in a landing-on-floor period, thereby correcting a desired ground contacting portion trajectory downward in the landing-on-floor period. Further, a negative mechanism deformation amount is determined on the basis of a virtual negative floor reaction force in a leaving-from-floor period, thereby correcting a desired ground contacting portion trajectory upward in the leaving-from-floor period. This makes it possible to smoothly connect the lowering motion of the ground contacting portion of the leg before the end of the leaving-from-floor period to the standing motion of the ground contacting portion of the leg on the floor surface after the start of the landing-on-floor period. In addition, from the aforesaid viewpoint, the force with which a leg of the traveling robot stands on the floor surface is properly controlled according to a landing impact easing characteristic of the compliance mechanism.

Further, the legged mobile robot according to the first embodiment of the present invention is equipped with a mechanism deformation compensation amount setting means which sets a mechanism deformation compensation amount for compensating for an influence of a mechanism deformation amount exerted on a desired ground contacting portion trajectory on the basis of the mechanism deformation amount determined by the mechanism deformation amount determining means, wherein the desired ground contacting portion trajectory correcting means corrects the desired ground contacting portion trajectory set by the desired ground contacting portion setting means on the basis of a mechanism deformation compensation amount set by the mechanism deformation compensation amount setting means.

A legged mobile robot according to a second embodiment of the present invention to fulfill the aforesaid object is equipped with a desired gait setting means for setting a desired gait which has, as a desired ground contacting portion trajectory, a ground contacting portion trajectory in which a component of a velocity of a ground contacting portion in a vertical direction or a component thereof in a direction perpendicular to a floor surface becomes zero when leaving a floor and immediately before leaving the floor and/or when landing and immediately after landing, and which satisfies a dynamic balance condition, a corrected desired ground contacting portion trajectory setting means which sets, as a corrected desired ground contacting portion trajectory, a desired ground contacting portion trajectory that has been corrected such that a component of a velocity of a ground contacting portion in a vertical direction or a component thereof in a direction perpendicular to a floor surface does not become zero when leaving a floor and immediately before leaving the floor and/or when landing and immediately after landing, and a leg controlling means which controls the velocity of approaching of a ground contacting portion to a floor surface by operating a leg on the basis of a corrected desired ground contacting portion trajectory set by the corrected desired ground contacting portion trajectory setting means.

The legged mobile robot according to the second embodiment of the present invention makes it possible to improve the follow-up of an actual floor reaction force to a desired floor reaction force and to obviate a situation in which a load on a leg immediately after the shift to the landing-on-floor period temporarily becomes excessive or a part of a foot is caught on a floor surface due to unsmooth unloading at a shift to the next leaving-from-floor period, as described above, thus permitting stable control of the robot. In other words, according to the robot of the second embodiment of the present invention, a force with which a leg of the robot in motion firmly stands on a floor surface can be properly controlled from a viewpoint of easing an impact to a leg at the time of landing and preventing a part of a foot of a leg from being caught on a floor at the time of leaving the floor.

The legged mobile robot according to the second embodiment of the present invention is equipped with a desired ZMP setting means which sets a desired ZMP, wherein the desired gait setting means sets a desired gait by defining a condition, under which a motion of a desired gait satisfies a desired ZMP, as the dynamic balance condition.

The present invention relates to a program which imparts, to a computer mounted on the robot, a function for controlling a motion of a legged mobile robot, which has a base body, a plurality of legs extended downward from the base body, and a compliance mechanism for easing a landing impact to each leg, and which travels by motions of each leg, involving the landing and leaving of a ground contacting portion of a distal end of each leg onto and from a floor.

A control program according to a first embodiment of the present invention to fulfill the aforesaid object imparts, to the computer mounted on the robot, a leg controlling function for controlling a motion of a leg such that a ground contacting portion lands onto a floor surface at a predetermined velocity in a vertical direction or in a direction perpendicular to the floor surface.

The control program according to the first embodiment of the present invention imparts to the robot the function that makes it possible to properly control a force with which a leg of a traveling robot stands on a floor surface from a viewpoint of easing an impact to a leg at the time of landing and preventing a part of the foot of the leg from being caught on the floor at the time of leaving the floor.

Further, the control program according to the first embodiment of the present invention imparts, to a computer mounted on the robot, a desired floor reaction force setting function for setting a desired value of a floor reaction force acting on the ground contacting portion as a desired floor reaction force, and also imparts, as a leg controlling function, a function for controlling a motion of a leg such that the predetermined velocity takes a ratio falling within a range of [0.1, 10] relative to the absolute value of a change rate of the amount of deformation of the compliance mechanism in the vertical direction or the direction perpendicular to the floor surface, which occurs immediately after the landing of the ground contacting portion of the leg due to the desired floor reaction force set by the desired floor reaction force setting function, to the computer mounted on the robot.

Further, the control program according to the first embodiment of the present invention imparts, to a computer mounted on the robot, a desired floor reaction force setting function for setting a desired value of a floor reaction force acting on the ground contacting portion as a desired floor reaction force, and also imparts, as a leg controlling function, a function for determining the predetermined velocity on the basis of a change rate of the amount of deformation of the compliance mechanism in the vertical direction or the direction perpendicular to the floor surface, which occurs immediately after the landing of the ground contacting portion of the leg due to the desired floor reaction force set by the desired floor reaction force setting function, and for controlling a motion of the leg such that the velocity of the ground contacting portion in the vertical direction downward or the direction perpendicular to the floor surface downward reaches the determined predetermined velocity by the landing, to the computer mounted on the robot.

Further, the control program according to the first embodiment of the present invention imparts, to a computer mounted on the robot, a desired floor reaction force setting function for setting a desired value of a floor reaction force acting on the ground contacting portion as a desired floor reaction force, a mechanism deformation amount determining function for determining the amount of deformation of a compliance mechanism occurring due to a desired floor reaction force set by the desired floor reaction force setting function as a mechanism deformation amount, a desired ground contacting portion trajectory setting function for setting a desired position of a ground contacting portion of a leg as a desired ground contacting portion trajectory, and a desired ground contacting portion trajectory correcting function for correcting the desired ground contacting portion trajectory set by the desired ground contacting portion trajectory setting function so as to compensate for an influence of a mechanism deformation amount determined by the mechanism deformation amount determining function exerted on the desired ground contacting portion trajectory, and also imparts, as a leg controlling function, a function for controlling a motion of a leg such that the velocity of the ground contacting portion in the vertical direction downward or the direction perpendicular to the floor surface downward reaches a predetermined velocity by the landing on the basis of a change rate of a component of a mechanism deformation amount in the vertical direction or a component thereof in the direction perpendicular to the floor surface immediately after the landing of the ground contacting portion determined by the mechanism deformation amount determining function in a leaving-from-floor period of the ground contacting portion, and for controlling a motion of a leg on the basis of a corrected desired ground contacting portion trajectory provided by a desired ground contacting portion trajectory correcting function in a landing-on-floor period of the ground contacting portion, to the computer mounted on the robot.

In addition, the control program according to the first embodiment of the present invention imparts, as a desired ground contacting portion trajectory correcting function, a function for correcting a component of a desired ground contacting portion trajectory in the vertical direction or a component thereof in the direction perpendicular to a floor surface, the desired ground contacting portion trajectory having been set by the desired ground contacting portion trajectory setting function, such that the component is shifted upward on the basis of a mechanism deformation amount immediately after the ground contacting portion lands, which has been determined by the mechanism deformation amount determining function, in a leaving-from-floor period of the ground contacting portion, while the component is shifted downward on the basis of a mechanism deformation amount set by the mechanism deformation amount determining function in a landing-on-floor period of the ground contacting portion to a computer mounted on the robot.

Further, the control program according to the first embodiment of the present invention imparts, to a computer mounted on the robot, a desired floor reaction force setting function for setting a desired value of a floor reaction force acting on a ground contacting portion as a desired floor reaction force, a mechanism deformation amount determining function for determining the amount of deformation of the compliance mechanism occurring due to a desired floor reaction force set by the desired floor reaction force setting function as a mechanism deformation amount, a desired ground contacting portion trajectory setting function for setting a desired position of a ground contacting portion of a leg as a desired ground contacting portion trajectory, and a desired ground contacting portion trajectory correcting function for determining a corrected desired ground contacting portion trajectory by correcting a desired ground contacting portion trajectory set by the desired ground contacting portion trajectory setting function so as to compensate for an influence of a mechanism deformation amount determined by the mechanism deformation amount determining function exerted on the desired ground contacting portion trajectory; imparts to the computer, as a desired floor reaction force setting function, a function for setting a desired floor reaction force that turns a component in the vertical direction or a component in the direction perpendicular to a floor surface in a landing-on-floor period of the ground contacting portion to be positive, while setting a virtual desired floor reaction force that turns the component in the vertical direction or the component in the direction perpendicular to a floor surface in a leaving-from-floor period of the ground contacting portion to be negative on the basis of a desired floor reaction force obtained immediately after landing; and imparts to the computer, as a leg controlling function, a function for controlling a motion of a leg on the basis of a corrected desired ground contacting portion trajectory determined by the desired ground contacting portion trajectory correcting function.

Further, the control program according to the first embodiment of the present invention imparts, to a computer mounted on the robot, a mechanism deformation compensation amount setting function for setting a mechanism deformation compensation amount for compensating for an influence of a mechanism deformation amount exerted on a desired ground contacting portion trajectory on the basis of the mechanism deformation amount determined by the mechanism deformation amount determining function, and also imparts, as a desired ground contacting portion trajectory correcting function, a function for correcting the desired ground contacting portion trajectory set by the desired ground contacting portion setting function on the basis of a mechanism deformation compensation amount set by the mechanism deformation compensation amount setting function to the computer mounted on the robot.

A control program according to a second embodiment of the present invention to fulfill the aforesaid object imparts a desired gait setting function for setting a desired gait which has, as a desired ground contacting portion trajectory, a ground contacting portion trajectory in which a component of a velocity of a ground contacting portion in a vertical direction or a component thereof in a direction perpendicular to a floor surface becomes zero at leaving a floor and immediately before leaving the floor and/or at landing and immediately after landing, and which satisfies a dynamic balance condition, a corrected desired ground contacting portion trajectory setting function which sets, as a corrected desired ground contacting portion trajectory, a desired ground contacting portion trajectory that has been corrected such that a component of a velocity of a ground contacting portion in a vertical direction or a component thereof in a direction perpendicular to a floor surface does not become zero at leaving a floor and immediately before leaving the floor and/or at landing and immediately after landing, and a leg controlling function for controlling the velocity of approaching of a ground contacting portion to a floor surface by operating a leg on the basis of a corrected desired ground contacting portion trajectory set by the corrected desired ground contacting portion trajectory setting function to a computer mounted on the robot.

The control program according to the second embodiment of the present invention imparts to the robot the function that makes it possible to properly control a force with which a leg of a traveling robot stands on a floor surface from a viewpoint of easing an impact to a leg at the time of landing and preventing a part of the foot of the leg from being caught on the floor at the time of leaving the floor.

Further, the control program according to the second embodiment of the present invention imparts a desired ZMP setting function for setting a desired ZMP to a computer mounted on the robot, and also imparts, as a desired gait setting function, a function for setting a desired gait by defining a condition, under which a motion of a desired gait satisfies a desired ZMP, as the dynamic balance condition, to the computer mounted on the robot.

BRIEF DESCRIPTION OF THE DRAWINGS

FIG. 18 is an explanatory diagram of the second embodiment of a method for controlling the operation of a leg of a robot in accordance with the present invention.

FIG. 19 is an explanatory diagram of a method for controlling the operation of a leg of a robot in a prior art.

BEST MODE FOR CARRYING OUT THE INVENTION

The following will explain embodiments of a legged mobile robot and a control program for the same in accordance with the present invention by using the accompanying drawings.

Figure 1:
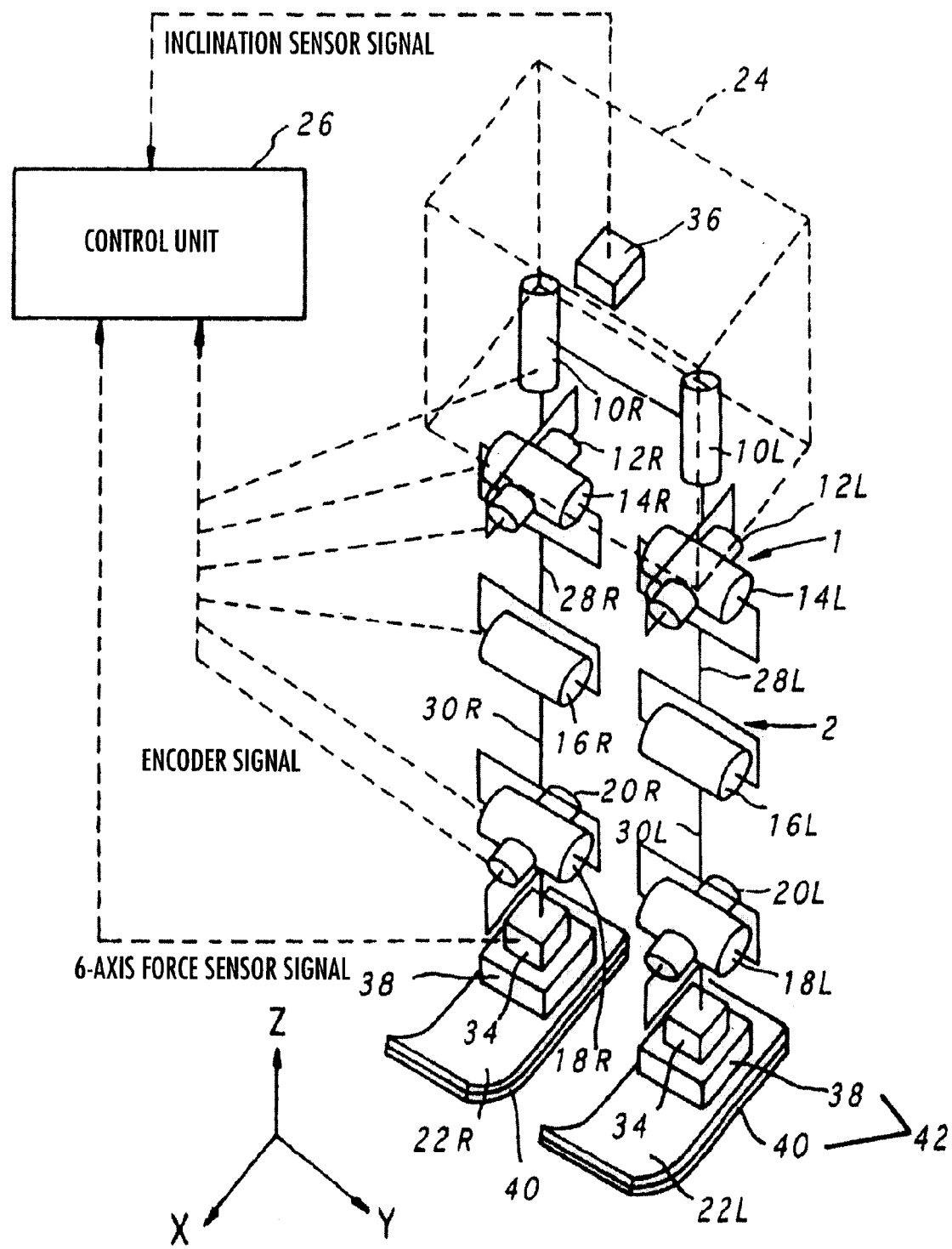
FIG. 1 is a schematic diagram showing an overview of the entire construction of a bipedal mobile robot as a legged mobile robot in an embodiment of the present invention.

FIG. 1 is a schematic diagram showing an overview of the entire construction of a bipedal mobile robot as a legged mobile robot to which a gait generator and a control unit according to the present embodiment are applied.

A bipedal mobile robot (hereinafter referred to as "the robot") 1 shown in the figure is equipped with a pair of right and left legs (leg links) 2, 2 extended downward from a body 24. The two legs 2, 2 share the same construction, each having six joints. The six joints are comprised of, in the following order from the body 24 side, joints 10R, 10L (the symbols R and L are the symbols meaning that they correspond to the right leg and the left leg, respectively; the same will apply hereinafter) for swinging (rotating) a hip (waist) (for rotating in a yaw direction relative to the body 24), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg 2 is attached to the bottoms of the two joints 18R(L) and 20R(L) of the ankle of each leg 2. The aforesaid body (base body) 24 is installed at the uppermost top of the two legs 2, 2 through the intermediary of the three joints 10R(L), 12R(L) and 14R(L) of the hip of each leg 2. A control unit 26 and the like, which will be discussed in detail hereinafter, is housed in the body 24. For the sake of convenience of illustration, the control unit 26 is shown outside the body 24 in FIG. 1.

The control unit 26 is constructed of a CPU, a ROM, a RAM, a signal input circuit, a signal output circuit, and the like as hardware and a "control program" in accordance with the present invention as software for imparting a motion control function of the robot 1 to the hardware.

In each leg 2 having the aforesaid construction, a hip joint (or a waist joint) is formed of the joints 10R(L), 12R(L) and 14R(L), the knee joint is formed of the joint 16R(L), and a foot joint (the ankle joint) is formed of the joints 18R(L) and 20R(L). The hip joint and the knee joint are connected by a thigh link 28R(L), and the knee joint and the foot joint are connected by a crus link 30R(L).

Although not shown, a pair of right and left arms is attached to both sides of an upper portion of the body 24, and a head is disposed at a top end of the body 24. These arms and the head are not directly associated with the main point of the present invention, so that detail explanation thereof will be omitted, but the arms permit motions, such as swinging the arms to the front and back relative to the body 24 through the intermediary of a plurality of joints provided therein.

The construction of the legs 2 described above imparts six degrees of freedom to the foot 22R(L) of each leg 2 relative to the body 24. When the robot 1 travels, desired motions of the two feet 22R and 22L can be accomplished by driving 6*2=12 joints of the two legs 2, 2 together ("*" in this description denotes multiplication for scalar calculation, while it denotes an outer product in vector calculation) at appropriate angles. This arrangement enables the robot 1 to freely travel in a three-dimensional space.

The position and velocity of the body 24, which will be discussed later in the present description, mean a predetermined position of the body 24, specifically, the position and moving velocity of a representative point determined beforehand (e.g., the central point between the right and left hip joints) of the body 24. Similarly, the positions and velocities of the feet 22R and 22L mean the positions and moving velocities of representative points of the feet 22R and 22L determined beforehand. In this case, in the present embodiment, the representative points of the feet 22R and 22L are set, for example, on the bottom surfaces of the feet 22R and 22L (more specifically, for example, the points at which perpendiculars from the centers of the ankle joints of the individual legs 2 to the bottom surfaces of the feet 22R and 22L intersect with the bottom surfaces).

As shown in FIG. 1, a publicly known 6-axis force sensor 34 is provided under the ankle joints 18R(L), 20R(L) and between the ankle joints and the foot 22R(L) of each leg 2. The 6-axis force sensor 34 detects primarily whether the foot 22R(L) of each leg 2 is in contact with the ground and a floor reaction force (ground contact load) acting on each leg 2, and outputs detection signals of three-direction components Fx, Fy and Fz of a translational force of the floor reaction force and three-direction components Mx, My and Mz of a moment to the control unit 26. Furthermore, the body 24 is equipped with an inclination sensor 36 for detecting an inclination (posture angle) of the body 24 relative to a Z-axis (vertical direction (gravitational direction)) and an angular velocity thereof, detection signals thereof being output from the inclination sensor 36 to the control unit 26. Although detailed structures are not shown, each joint of the robot 1 is provided with an electric motor 32 (refer to FIG. 3) for driving the joint and an encoder (rotary encoder) 33 (refer to FIG. 3) for detecting a rotational amount of the electric motor 32 (a rotational angle of each joint). Detection signals of the encoder 33 are output from the encoder 33 to the control unit 26.

Figure 2:
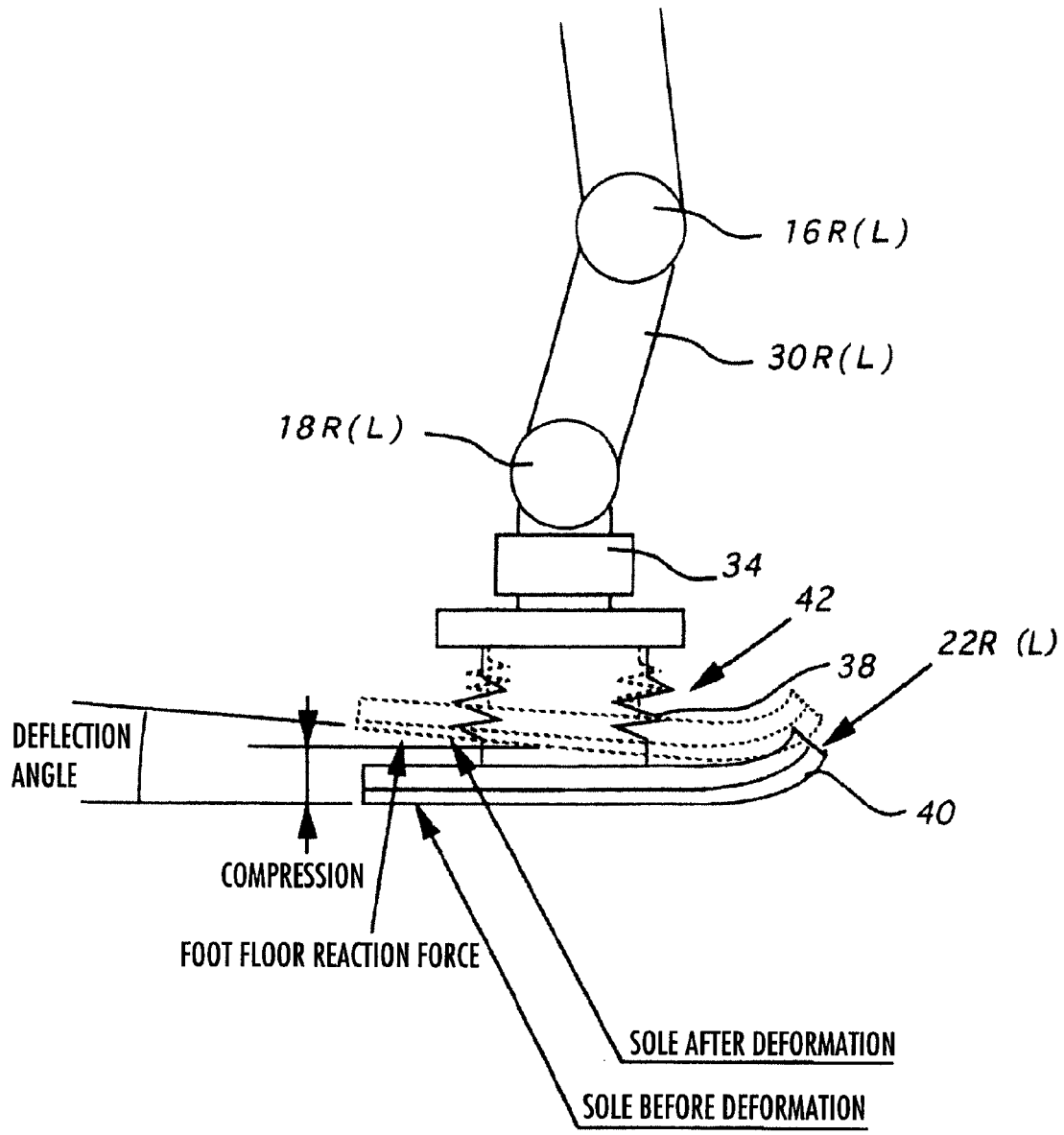
FIG. 2 is a side view showing the construction of a foot portion of each leg of the robot shown in FIG. 1.

As shown in FIG. 2, a spring mechanism (a first compliance mechanism) 38 is installed between each foot 22R(L) and the aforesaid 6-axis force sensor 34, and a sole elastic member (a second compliance mechanism) 40 made of rubber or the like is bonded to a sole (the bottom surface of each foot 22R (L)). These spring mechanism 38 and the sole elastic member 40 constitute a compliance mechanism 42. Specifically, the spring mechanism 38 is constructed of a square guide member (not shown), which is installed on the upper surface of the foot 22R(L), and a piston-shaped member (not shown), which is installed adjacently to the ankle joint 18R(L) (the ankle joint 20R(L) being omitted in FIG. 2) and the 6-axis force sensor 34 and housed in the guide member through the intermediary of an elastic member (rubber or spring) so that it may be moved extremely slightly. The compliance mechanism may alternatively be constructed of the links 28 and 30 of the leg 2.

The foot 22R(L) indicated by a solid line in FIG. 2 is in a state wherein the foot 22R(L) is being subjected to no floor reaction force. When each leg 2 is subjected to a floor reaction force, the spring mechanism 38 and the sole elastic member 40 of the compliance mechanism 42 flex, causing the foot 22R(L) to shift to the position/posture illustrated by a dashed line in the figure. The structure of the compliance mechanism 42 is important not only to ease a landing impact but also to enhance controllability of the robot 1. The details thereof have been explained in Japanese Patent Laid-Open Publication No. 5-305584 previously proposed by the present applicant, so that detailed explanation will be omitted.

Furthermore, although not shown in FIG. 1, a joystick (operating device) 44 (refer to FIG. 3) for manipulating the robot 1 is provided on the exterior of the robot 1. The joystick 44 is constructed such that a request on a gait of the robot 1, e.g., a request for turning the robot 1 that is traveling straight, can be input to the control unit 26 as necessary by operating the joystick 44. In this case, requests that can be input includes, for example, gait modes (walking, running, etc.) when the robot 1 is traveling, the landing position/posture or landing time of a free leg, or command data specifying these landing position/posture or landing time (e.g., the traveling direction, traveling velocity or the like of the robot 1).

Figure 3:
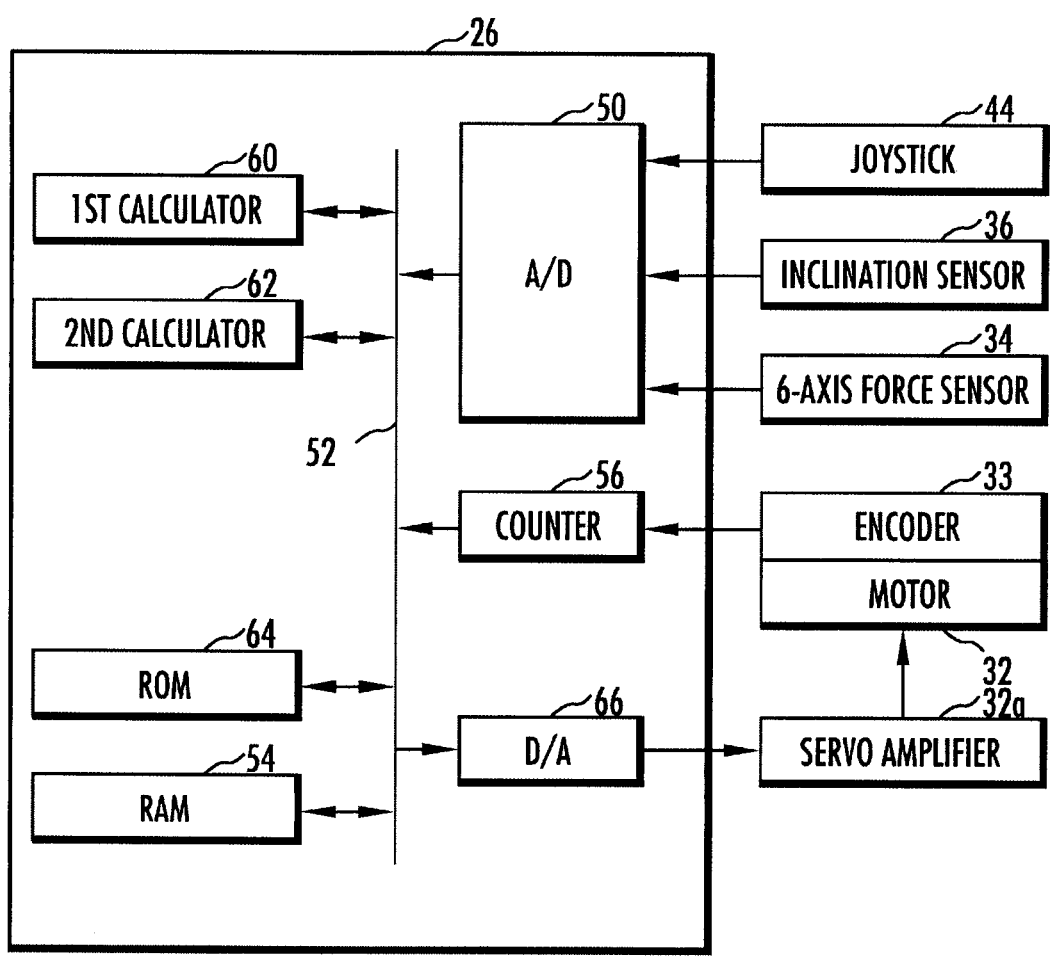
FIG. 3 is a block diagram showing the construction of a control unit provided in the robot shown in FIG. 1.

FIG. 3 is a block diagram showing the construction of the control unit 26. The control unit 26 is comprised of a microcomputer, and includes a first calculator 60 and a second calculator 62 formed of CPUs, an A/D converter 50, a counter 56, a D/A converter 66, a RAM 54, a ROM 64, and a bus line 52 for transferring data among them. In the control unit 26, output signals of the 6-axis force sensor 34 of each leg 2, the inclination sensor 36, the joystick 44, etc. are converted into digital values by the A/D converter 50 and then input to the RAM 54 via the bus line 52. Outputs of the encoder 33 (rotary encoder) of each joint of the robot 1 are input to the RAM 54 via the counter 56.

As will be discussed hereinafter, the first calculator 60 generates a desired gait, calculates a joint angle displacement command (a command value of a displacement angle of each joint or a rotational angle of each electric motor 32), and sends the calculated command to the RAM 54. The second calculator 62 reads the joint angle displacement command and an actual measurement value of a joint angle detected on the basis of an output signal of the encoder 33 from the RAM 54 to calculate a manipulated variable required for driving each joint and outputs the calculated manipulated variable to the electric motor 32 for driving each joint through the intermediary of the D/A converter 66 and a servo amplifier 32a.

Figure 4:
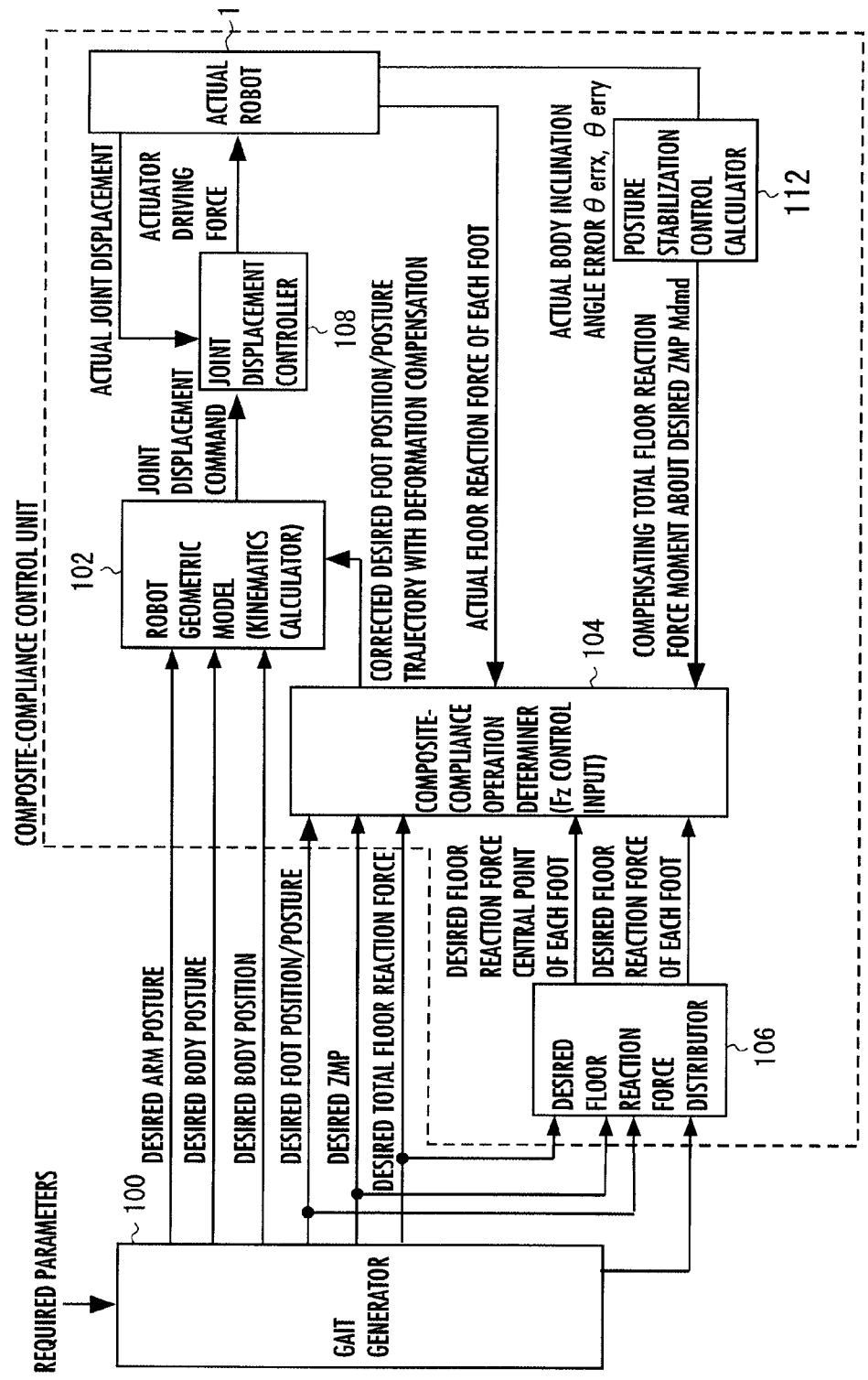
FIG. 4 is a block diagram showing the functional construction of the control unit shown in FIG. 3.

FIG. 4 is a block diagram showing a general view of the functional construction of the gait generator and the control unit of the robot 1 in the present embodiment. A portion except the portion of the "actual robot" in FIG. 4 is constituted of processing functions implemented by the control unit 26 (primarily the functions of the first calculator 60 and the second calculator 62). In the following explanation, the aforesaid symbols R and L will be omitted as long as it is not particularly necessary to discriminate between right and left legs 2.

In FIG. 4, a gait generator 100 and a desired floor reaction force distributor 106 constitute "the desired floor reaction force setting means," the gait generator constitutes "the desired foot (ground contacting portion) trajectory setting means," a composite compliance operation determiner 104 constitutes "the desired foot (ground contacting portion) trajectory correcting means," and a joint displacement controller 108 constitutes "the leg controlling means" in the present invention.

The present invention is characterized in that the operation of the leg 2 is controlled such that the foot 22 has a predetermined velocity in the vertical direction downward or in the direction perpendicular to a floor surface downward when the foot shifts from a leaving-from-floor period (=the free leg period of the leg 2) to a landing-on-floor period (=the landing period of the leg 2) so as to compensate for a deformation amount of the compliance mechanism 42 when a desired floor reaction force acts on the foot 22. This characteristic will be explained later.

An explanation will be given below. The control unit 26 is equipped with a gait generator 100 that generates and outputs desired gaits freely in real time, as it will be discussed later. The gait generator 100 constitutes the means in the invention of the present application by its functions. A desired gait output by the gait generator 100 is constituted of a desired body position/posture trajectory (the trajectory of desired positions and desired postures of the body 24), a desired foot position/posture trajectory (the trajectory of desired positions and desired postures of each foot 22), a desired arm posture trajectory (the trajectory of desired postures of each arm body), a desired total floor reaction force central point (desired ZMP) trajectory, and a desired total floor reaction force trajectory. If a portion that can be moved relative to the body 24 is provided in addition to the legs 2 and the arms, then a desired position/posture trajectory of the movable portion is added to a desired gait.

Here, the "trajectory" in the aforesaid gait means a temporal change pattern (time series pattern) and it may be referred to as "pattern" in place of "trajectory." Further, the "posture" means a spatial orientation. Specifically, for example, a body posture is represented by an inclination angle (posture angle) of the body 24 in the roll direction (about the X-axis) relative to the Z-axis (vertical axis) and an inclination angle (posture angle) of the body 24 in the pitch direction (about the Y-axis), and a foot posture is represented by means of a two-axis spatial azimuth fixedly set on each foot 22. In the present description, a body posture may be referred to as a body posture angle.

In the explanation hereinafter, the "desired" will be frequently omitted if there is no danger of misunderstanding. Among gaits, a gait related to constituent elements other than the constituent elements related to a floor reaction force, namely, a gait related to a motion of the robot 1, such as foot position/posture and body position/posture, will be referred generically to "motions." Further, a floor reaction force acting on each foot 22 (a floor reaction force composed of a translational force and a moment) will be referred to as "the floor reaction force of each foot," and the resultant force of "the floor reaction forces of each foot" related to all (two) feet 22R and 22L of the robot 1 will be referred to as "the total floor reaction force." However, in the following explanation, the floor reaction force of each foot will be hardly referred to, so that "the floor reaction force" will be handled as synonymous with "the total floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment about a vertical axis (Z-axis)) will be zero. In other words, a horizontal component (the moment about horizontal axes (X-axis and Y-axis)) of the moment of the desired floor reaction force about the desired floor reaction force central point will be zero.

In a gait that satisfies a dynamic balance condition, the ZMP calculated from a desired motion trajectory of the robot 1 (the point at which a moment excluding its vertical component becomes zero, the moment acting about the point attributable to the resultant force of the inertial force calculated from the desired motion trajectory and the gravity) coincides with the desired floor reaction force central point. This is, therefore, equivalent to providing a desired ZMP trajectory in place of a desired floor reaction force central point trajectory (for details, refer to Japanese Patent Application No. 2000-352011 by the present applicant).

With the aforesaid background, in the description of the above Japanese Patent Application No. 2000-352011, a desired gait has been defined as follows:

a) A desired gait in a broad sense is a set of a desired motion trajectory in a period of one step or a plurality of steps and a desired floor reaction force trajectory thereof.

b) A desired gait in a narrow sense is a set of a desired motion trajectory of a one-step period and a ZMP trajectory thereof.

c) A series of gaits consists of several connected gaits.

In the walking mode, if a vertical position of the body 24 (body height) of the robot 1 is determined by the body height determining technique previously proposed in Japanese Patent Laid-Open Publication No. H10-86080 by the present applicant, then a translational floor reaction force vertical component is subordinately determined. Furthermore, a translational floor reaction force horizontal component is also determined by determining the body horizontal position trajectory of the robot 1 such that the horizontal component of a moment generated about a desired ZMP by a resultant force of an inertial force by a motion of a desired gait and gravity is zero. Thus, in the description of Japanese Patent Application No. 2000-352011, a desired ZMP alone was adequate as a physical quantity to be explicitly set in relation to a floor reaction force of a desired gait. Accordingly, as the definition of a desired gait in the narrow sense, the one in b) above has been adequate. In comparison thereto, in a running gait (to be described in detail later) of the robot 1 explained in the present embodiment, a floor reaction force vertical component (translational floor reaction force vertical component) is also important in control. For this reason, according to the present invention, a desired trajectory of the floor reaction force vertical component is explicitly set, and then the trajectory of a desired body vertical position or the like of the robot 1 is determined. In the present description, therefore, the following b') is used as the definition of a desired gait in the narrow sense.

b') A desired gait in the narrow sense is a set of a desired motion trajectory in a period of one step and a desired ZMP trajectory thereof and a desired translational floor reaction force vertical component trajectory.

In the present description, hereinafter, for the purpose of easy understanding, a desired gait will be used to mean the desired gait in the narrow sense in b') above unless otherwise specified. In this case, "one step" of a desired gait will be used to mean a period from the instant one leg 2 of the robot 1 lands to the instant the other leg 2 lands. In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component."

Needless to say, a two-leg supporting period in a gait refers to a period during which the robot 1 supports its own weight by the two legs 2, 2, a one-leg supporting period refers to a period during which the robot 1 supports its own weight only by one leg 2, and a floating period refers to a period during which both legs 2, 2 are apart from a floor (floating in the air). In the one-leg supporting period, the leg 2 not supporting the self-weight of the robot 1 is referred to as a "free leg." In a running gait to be explained in the present embodiment, the one-leg supporting period (landing-on-floor period) and the floating stance period are alternately repeated, no two-leg supporting period being included. In this case, during the floating period, both legs 2, 2 do not support the self-weight of the robot 1; however, the leg 2 that was a free leg and the leg 2 that was a supporting leg during a one-leg supporting period immediately before the floating period will be referred to as a free leg and a supporting leg, respectively, even in the floating period.

An overview of a desired gait generated by the gait generator 100 will be explained, taking the running gait shown in FIG. 5 as an example. Other definitions and details regarding gaits have been described in Japanese Patent Laid-Open Publication No. 10-86081 previously proposed by the present applicant, so that the following explanation will be mainly focused on matters not described in Japanese Patent Laid-Open Publication No. 10-86081.

First, the running gait shown in FIG. 5 will be explained. The running gait is a gait similar to a standard running gait of a human being. In this running gait, the one-leg supporting period during which the foot 22 of only one leg 2 (supporting leg), either the right or left leg, of the robot 1 lands (contacts the ground) and the floating period during which both legs 2, 2 float in the air are alternately repeated. In FIG. 5, the first state shows a state at the beginning (initial state) of a one-leg supporting period, the second state shows a state at a midpoint of the one-leg supporting period, the third state shows a state at the beginning of a floating period that follows the one-leg supporting period (at the end of the one-leg supporting period), the fourth state shows a state at a midpoint of the floating period, and the fifth state shows a state at the end of the floating period (at the beginning of the next one-leg supporting period).

Figure 5:
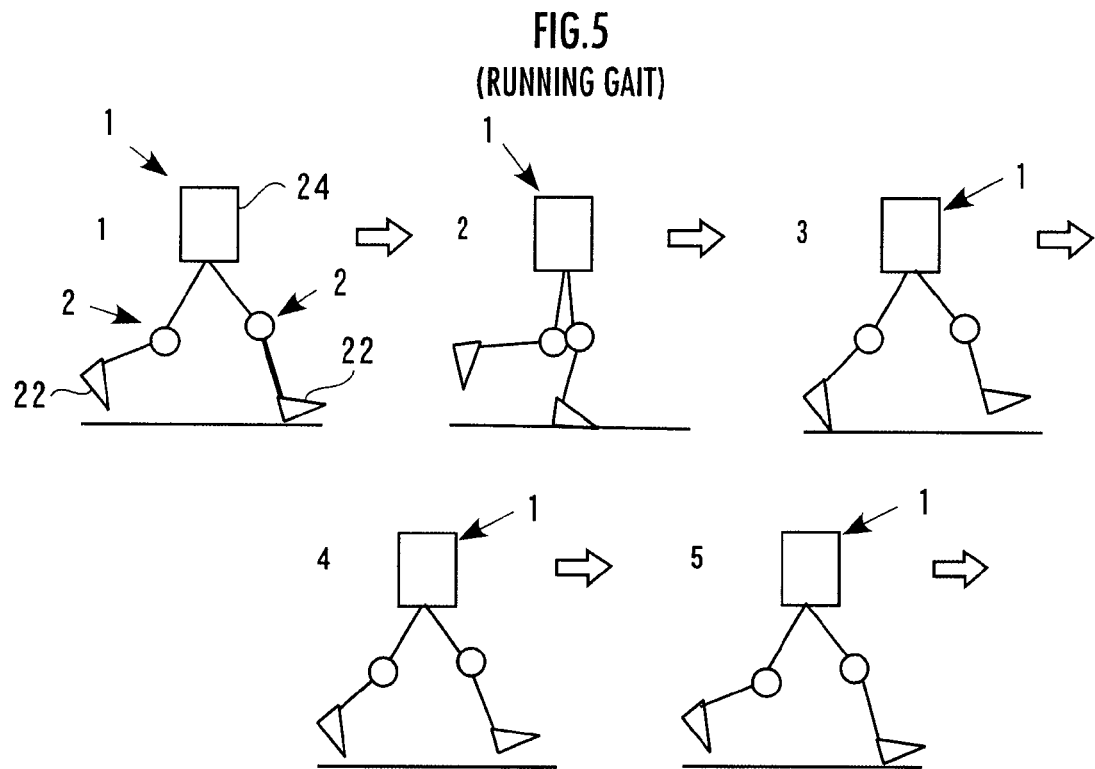
FIG. 5 provides explanatory diagrams illustrating a running gait of the robot shown in FIG. 1.

In the running gait, the robot 1 lands at the heel of the foot 22 of the supporting leg (the leg 2 at the front with respect to the advancing direction of the robot 1) at the beginning of the one-leg supporting period, as shown by the first state in FIG. 5. Subsequently, the robot 1 lands with substantially the entire bottom surface of the landed foot 22 (the foot 22 of the supporting leg) as illustrated by the second state in FIG. 5, then jumps into the air by kicking the floor at the toe of the foot 22 of the supporting leg (the foot 22 of the leg 2 at the rear with respect to the advancing direction of the robot 1 in the third state in FIG. 5) as illustrated by the third state in FIG. 5. Thus, the instant the one-leg supporting period ends, the floating period starts. Incidentally, the free leg in the one-leg supporting period exists at the rear of the supporting leg at the start of the one-leg supporting period, as illustrated by the first state in FIG. 5, but it is swung out to the front of the supporting leg toward the next expected landing position, as illustrated by the second and the third states in FIG. 5. Subsequently, following the floating period illustrated by the fourth state in FIG. 5, the robot 1 lands at the heel of the foot 22 of the free leg (the leg 2 which was the free leg in the one-leg supporting period immediately before the floating period began), then the next one-leg supporting period is started. Incidentally, the robot 1 may alternatively lands with substantially the entire surface of the sole of the foot 22 rather than at the heel of the foot 22 of the supporting leg.

Taking the running gait shown in FIG. 5 into account, a basic outline of a desired gait generated by the gait generator 100 will be explained. Although the details will be given later, when the gait generator 100 generates a desired gait, basic required values (required parameters) for generated a desired gait, such as the landing position/posture (predicted landing position/posture) of the foot 22 of the free leg and landing time (predicted landing time), are supplied to the gait generator 100 in response to a predetermined operation or the like of the joystick 44. Then, the gait generator 100 generates the desired gait, using the required parameters. More specifically, the gait generator 100 determines a parameter (referred to as a gait parameter) that specifies some constituent elements of the desired gait, such as a desired foot position/posture trajectory and a desired floor reaction force vertical component trajectory, of the desired gait on the basis of the aforesaid required parameters. Then, the gait generator 100 sequentially determines instantaneous values of the desired gait, using the gait parameter, and generates a time series pattern of the desired gait.

In this case, the desired foot position/posture trajectory (more specifically, the desired trajectory of spatial components (including X-axis component) of the position and the posture of a foot) is generated for each foot 22 by using, for example, a finite-duration setting filter proposed in U.S. Pat. No. 3,233,450 by the present applicant. This finite-duration setting filter includes a plurality of stages (3 stages or more in the present embodiment) of first-order lag filters of variable time constants, that is, filters represented in terms of a transfer function of $1/(1+\tau s)$ ($\tau$ is a variable time constant. Hereinafter, the filter will be referred to as a unit filter), the plurality of stages of the filters being connected in series. This arrangement makes it possible to generate and output a trajectory that reaches a specified value at desired specified time. In this case, time constant $\tau$ of the unit filter of each stage is always variably set in sequence according to remaining time until the above specified time after starting the generation of an output of the finite-duration setting filter. More specifically, the setting is made such that the value of $\tau$ is decreased from a predetermined initial value ($>0$) as the remaining time reduces, and the value of $\tau$ finally reaches zero at the specified time at which the remaining time reaches zero. An input of a step of a height based on the specified value (more specifically, a change amount from an initial value to the specified value of an output of the finite-duration setting filter) is supplied to the finite-duration setting filter. The finite-duration setting filter not only generates an output that reaches a specified value at specified time but also makes it possible to set a changing rate of an output of the finite-duration setting filter at specified time to zero or substantially zero. Especially when three stages or more (3 stages will do) of the unit filter are connected, the changing acceleration (a differential value of a changing rate) of an output of the finite-duration setting filter can be reduced to zero or substantially zero.

The generation of the foot position/posture trajectory (the position/posture trajectory from the instant the foot 22 lands to the instant the foot 22 lands next) by using the aforesaid finite-duration setting filter is accomplished, for example, as follows. For example, a desired foot position trajectory in the x-axis direction (longitudinal direction) is generated as described below. The height of the step input to the finite-duration setting filter is determined on the basis of the position in the x-axis direction of the next predicted landing position of each foot 22 defined by the aforesaid required parameters (more specifically, an amount of change (travel distance) in the x-axis direction of the next predicted landing position in relation to the immediately preceding landing position; this corresponds to the aforesaid specified value) and the time constant τ is initialized to a predetermined initial value, and then the determined step input is supplied to the finite-duration setting filter, thus starting the generation of the trajectory of the positions in the x-axis direction of the foot 22. When generating the trajectory, the time constant τ is sequentially and variably set such that it reduces from the initial value to zero until the predicted landing time (this corresponds to the aforesaid specified time) of the foot 22. Thus, the trajectory of the positions of the foot 22 in the x-axis direction that allows the predicted landing position to be reached at the predicted landing time is generated.

Further, a desired foot position trajectory in the z-axis direction (vertical direction) is generated, for example, as follows. First, the position of the foot 22 in the z-axis direction where the foot 22 reaches a maximum height (vertical position) (hereinafter referred to as the position of the maximum point) and the time for reaching the position of the maximum point are determined on the basis of the next predicted landing position and the next predicted landing time of the foot 22. Then, after the height of the step input to the finite-duration setting filter is determined on the basis of the position of the maximum point (this corresponds to the aforesaid specified value) and the time constant τ is initialized, the determined step input is supplied to the finite-duration setting filter to sequentially generate the foot position trajectory in the z-axis direction up to the maximum point position. At this time, the time constant τ is sequentially and variably set such that it reduces from the initial value to zero until the time at which the position of the maximum point is reached (corresponding to the aforesaid specified time). Further, upon completion of the generation of the trajectory of the position in the z-axis direction up to the position of the maximum point, the time constant τ is initialized and the step inputs and reverse polarity step inputs in the past (more specifically, the reverse polarity step inputs of height based on the amount of change in the z-axis direction from the position of the maximum point to the next predicted landing position (corresponding to the aforesaid specified value) are input to the finite-duration setting filter so as to sequentially generate the trajectory of the foot position in the z-axis direction from the position of the maximum point to the predicted landing position. At this time, the time constant τ is sequentially and variably set such that it reduces from the initial value to zero until the predicted landing time of the foot 22.

When generating the foot position trajectory in the z-axis direction, the time constant τ may be variably set such that it continuously reduces from the initial value to zero until the predicted landing time of the foot 22 from the trajectory generation starting time, and the polarity of step inputs may be switched to the reverse polarity at the time when the position of the maximum point is reached or at time in the vicinity thereof so as to generate a foot position trajectory in the z-axis direction. This allows the foot 22 to reach a predicted landing position at the predicted landing time with no problem although it does not allow the foot 22 to reach a desired position of the maximum point with high accuracy.

The foot posture trajectory can be also generated by using the finite-duration setting filter in the same manner as that for the foot position trajectory described above. In this case, among the spatial components of a foot posture, for the components whose posture angular changes are monotonous (monotonously increase or monotonously decrease), a foot posture trajectory may be generated as in the generation of the foot position trajectory in the x-axis direction described above. For components whose posture angular changes have maximal values or minimal values, a foot posture trajectory may be generated as in the generation of the foot position trajectory in the z-axis direction as described above.

The desired foot position/posture trajectory generated by the finite-duration setting filter, as described above, is the desired position/posture trajectory of each foot 22 in the supporting leg coordinate system fixed to a floor surface, which will be discussed later.

The desired foot position/posture trajectory generated as described above is generated such that the position of each foot 22 begins moving while gradually accelerating toward a predicted landing position from its initial ground contact state (the state at the initial time of a desired gait). And, the desired foot position/posture trajectory is generated such that a changing velocity of a position in the vertical direction downward or the direction perpendicular to a floor surface downward reaches zero at the predicted landing time. Hence, the ground speed (the changing velocity of the position of each foot 22 in the supporting leg coordinate system fixed to a floor) at the instant when each foot 22 lands becomes positive.

A foot posture continues to move until substantially the entire surface of the sole of each foot 22 comes in contact with a floor after the foot 22 lands at the heel thereof at the predicted landing time. Hence, the time at which substantially the entire surface of the sole of the foot 22 comes in contact with the floor is set as the aforesaid specified time to generate a foot posture trajectory by the finite-duration setting filter.

In the present embodiment, the foot position trajectory has been generated using the finite-duration setting filter; alternatively, however, the desired foot position trajectory may be generated using a function, such as a polynomial expression which has been set such that the changing velocity of the foot position in the vertical direction downward or the direction perpendicular to a floor surface downward at the predicted landing time becomes zero (the time differential value of the foot position becomes zero on the vertical direction downward or the direction perpendicular to a floor surface downward). This applies also to the generation of a desired foot posture trajectory. However, regarding the generation of the desired foot posture trajectory, a function, such as a polynomial expression, is set such that the changing velocity of the posture of each foot 22 in the vertical direction downward or the direction perpendicular to a floor surface downward becomes zero at the time when substantially the entire surface of the sole of each foot 22 comes in contact with the floor, as described above.

Figure 6:
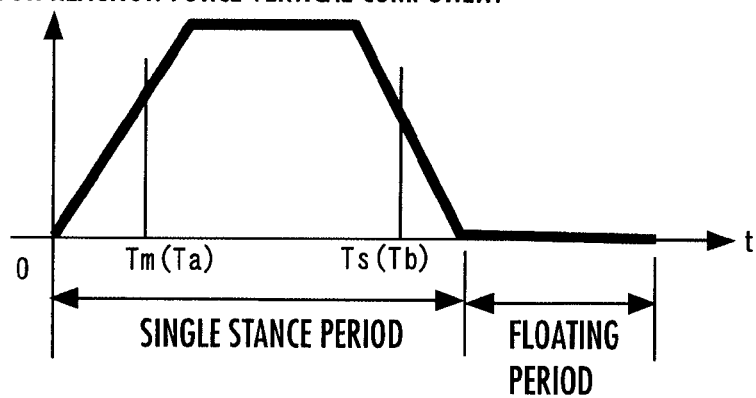
FIG. 6 is a chart showing a setting example of a desired floor reaction force vertical component.

A desired floor reaction force vertical component trajectory is set, for example, as illustrated in FIG. 6. In the present embodiment, the configuration of a desired floor reaction force vertical component trajectory in a running gait (more specifically, the configuration in a one-leg supporting period) is specified to be trapezoidal (shaped to be convex toward the increasing side of a floor reaction force vertical component). The height of the trapezoid and the time of breakpoints are taken as gait parameters that define the desired floor reaction force vertical component trajectory, and the gait parameters (floor reaction force vertical component trajectory parameters) are determined. In a floating period of the running gait, the desired floor reaction force vertical component is steadily set to be zero. As in this example, the desired floor reaction force vertical component trajectory is desirably set so that it is virtually continuous (values are not discontinuous). This is for ensuring smooth motions of joints of the robot 1 when controlling a floor reaction force. Incidentally, "virtually continuous" means that skipped values, which inevitably occur when digitally expressing a trajectory that continues in an analog fashion (continuous trajectory in a true meaning) by means of a discrete-time system, do not lead to loss of the continuity of the trajectory.

Figure 7:
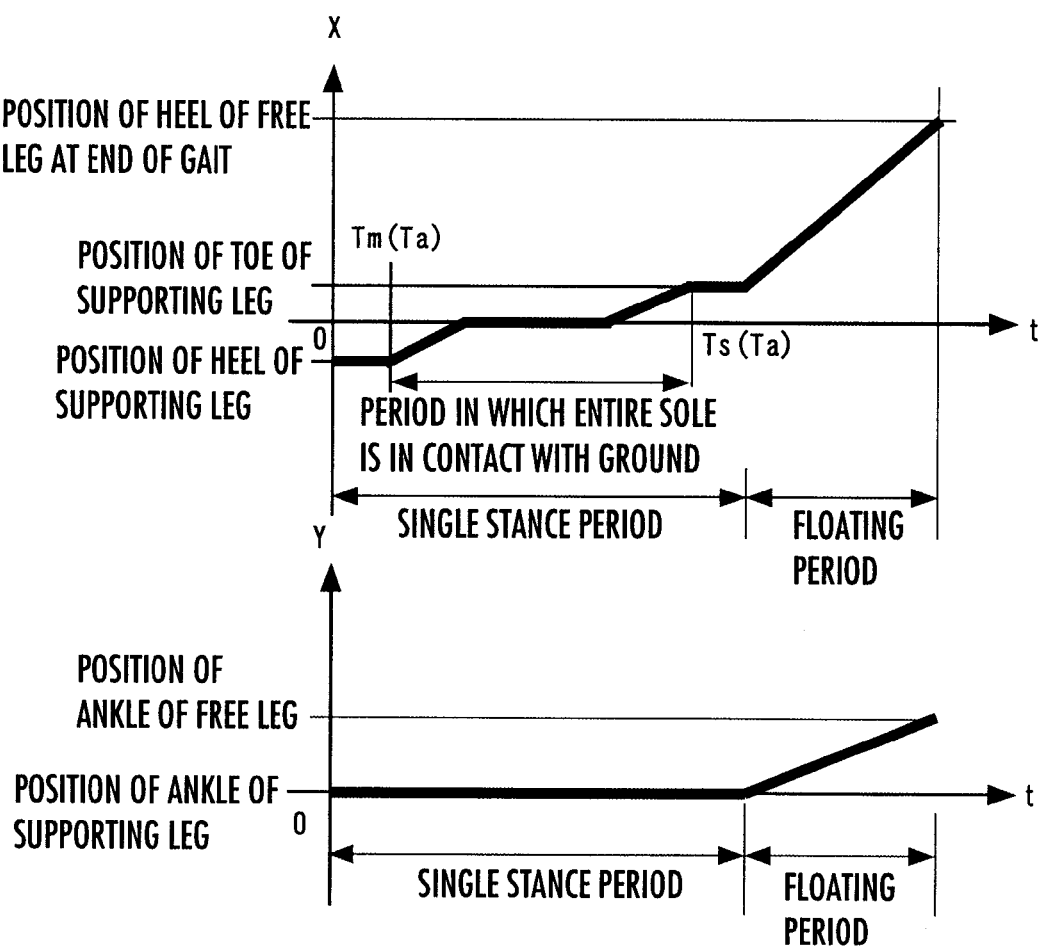
FIG. 7 is a chart showing a setting example of a desired ZMP.

A desired ZMP trajectory is set as follows. In the running gait shown in FIG. 5, the robot 1 lands at the heel of the foot 22 (e.g., a first ground contact point of a predicted ground contact point of the foot 22) of the supporting leg thereof, as described above, and then kicks at the toe of the foot 22 of the supporting leg to jump into the air, and lastly lands at the heel of the foot 22 of the free leg. Accordingly, the desired ZMP trajectory in the one-leg supporting period is set such that the trajectory defines the heel of the foot 22 of the supporting leg as the initial position and then moves to the center in the longitudinal direction of the foot 22 in a period during which substantially the entire bottom surface of the foot 22 of the supporting leg comes in contact with the ground, and thereafter, moves to the toe of the foot 22 of the supporting leg by the leaving-from-floor time, as shown in the upper chart of FIG. 7. Here, the upper chart of FIG. 7 shows a desired ZMP trajectory in the x-axis direction (longitudinal direction), while the lower chart of FIG. 7 shows a desired ZMP trajectory in the y-axis direction (lateral direction). Incidentally, the desired ZMP trajectory in the y-axis direction in the one-leg supporting period is set to the same position as the central position of the ankle joint of the leg 2 of the supporting leg in the y-axis direction, as shown in the lower chart of FIG. 7.

In the running gait, further, after the one-leg supporting period ends, both legs 2 and 2 leave the floor and the floor reaction force vertical component becomes zero. When the floor reaction force vertical component is zero, that is, during a floating period, the total center-of-gravity of the robot 1 performs free fall motions, resulting in no change in the amount of angular motion about the total center-of-gravity. At this time, the moment of the resultant force of the gravity and an inertial force acting on the robot 1 at any point on the floor is zero, so that a desired ZMP is indeterminate. This means that any point on the floor is a point of action at which the horizontal component of a moment produced by the resultant force of gravity and an inertial force is zero, which satisfies a condition of ZMP. In other words, setting the desired ZMP at any point will satisfy a dynamic balance condition under which the horizontal component of the moment about the desired ZMP produced by the aforesaid resultant force is zero. Therefore, a desired ZMP may be discontinuously set. For example, in a floating period, a desired ZMP may be set such that it does not move from a desired ZMP position at the time of leaving a floor (at the end of a one-leg supporting period) and at the terminal end of the floating period, the desired ZMP may be discontinuously (in steps) move to a desired ZMP position at the time of landing. In the present embodiment, however, as shown in the upper chart of FIG. 7, the position of the desired ZMP trajectory in the x-axis direction in the floating period has been set such that it continuously moves from the toe of the foot 22 of the supporting leg to the landing position of the heel of the foot 22 of the free leg by the next landing of the leg 2 of the free leg. Further, as shown in the lower chart of FIG. 7, the position of the desired ZMP trajectory in the y-axis direction in the floating period is set such that it continuously moves from the position in the y-axis direction of the center of the ankle joint of the leg 2 of the supporting leg to the position in the y-axis direction of the center of the ankle joint of the leg 2 of the free leg by the next landing of the leg 2 of the free leg. This means that the desired ZMP trajectory is continuous (virtually continuous) throughout the gait. Further, as will be discussed later, the desired gait is generated (more specifically, the desired body position/posture trajectory is adjusted) such that the moment (excluding the vertical component) of the resultant force of gravity and an inertial force about the desired ZMP becomes zero.

In the present embodiment, the positions and time of the breakpoints of the desired ZMP trajectory, as shown in FIG. 7, are set as the ZMP trajectory parameters (parameters that define the desired ZMP trajectory). The meaning of "virtually continuous" of the ZMP trajectory mentioned above is the same as the case of the aforesaid floor reaction force vertical component trajectory.

The ZMP trajectory parameters are determined to provide high stability allowance and restrain sudden changes. Here, a state in which a desired ZMP lies around the center of a minimum convex polygon (so-called supporting polygon) that includes ground contacting surfaces of the robot 1 is referred to as a high stability allowance (for details, refer to Japanese Patent Laid-Open Publication No. 10-86081). The desired ZMP trajectory shown in FIG. 7 has been set to satisfy the aforesaid condition.

A desired arm posture is represented by a relative posture with respect to the body 24.

Desired body position/posture, desired foot position/posture, and a reference body posture, which will be discussed hereinafter, are described in terms of a global coordinate system. The global coordinate system is a coordinate system fixed to a floor, as described above. More specifically, a supporting leg coordinate system, which will be discussed hereinafter, is used as the global coordinate system.

The gait generator 100 in the present embodiment generates a desired gait for one step in order, the desired gait (the desired gait in the aforesaid narrow sense) for one step from the instant one leg 2 of the robot 1 lands to the instant the other leg 2 lands being counted as a unit. Accordingly, in the running gait shown in FIG. 5 generated in the present embodiment, the desired gaits are generated in order from the start of a one-leg supporting period to the end of a subsequent floating period (the start of the next one-leg supporting period). Here, a desired gait that is to be generated anew is called a "current time's gait," the next desired gait is called a "next time's gait," and the further next desired gait is called a "next but one time's gait." A desired gait generated immediately preceding the "current time's gait" is called a "last time's gait."

When the gait generator 100 generates a current time's gait anew, required values (requirements) of the predicted landing positions/postures and predicted landing time of the foot 22 of a free leg for the next two steps of the robot 1 are input to the gait generator 100 as the required parameters (or the gait generator 100 reads the required parameters from a storage unit). Then, the gait generator 100 uses these required parameters to generate a desired body position/posture trajectory, a desired foot position/posture trajectory, a desired ZMP trajectory, a desired floor reaction force vertical component trajectory, a desired arm posture trajectory, and the like. At this time, some of the gait parameters defining these trajectories are corrected, as necessary, so as to secure the continuity of walking.

Figure 8:
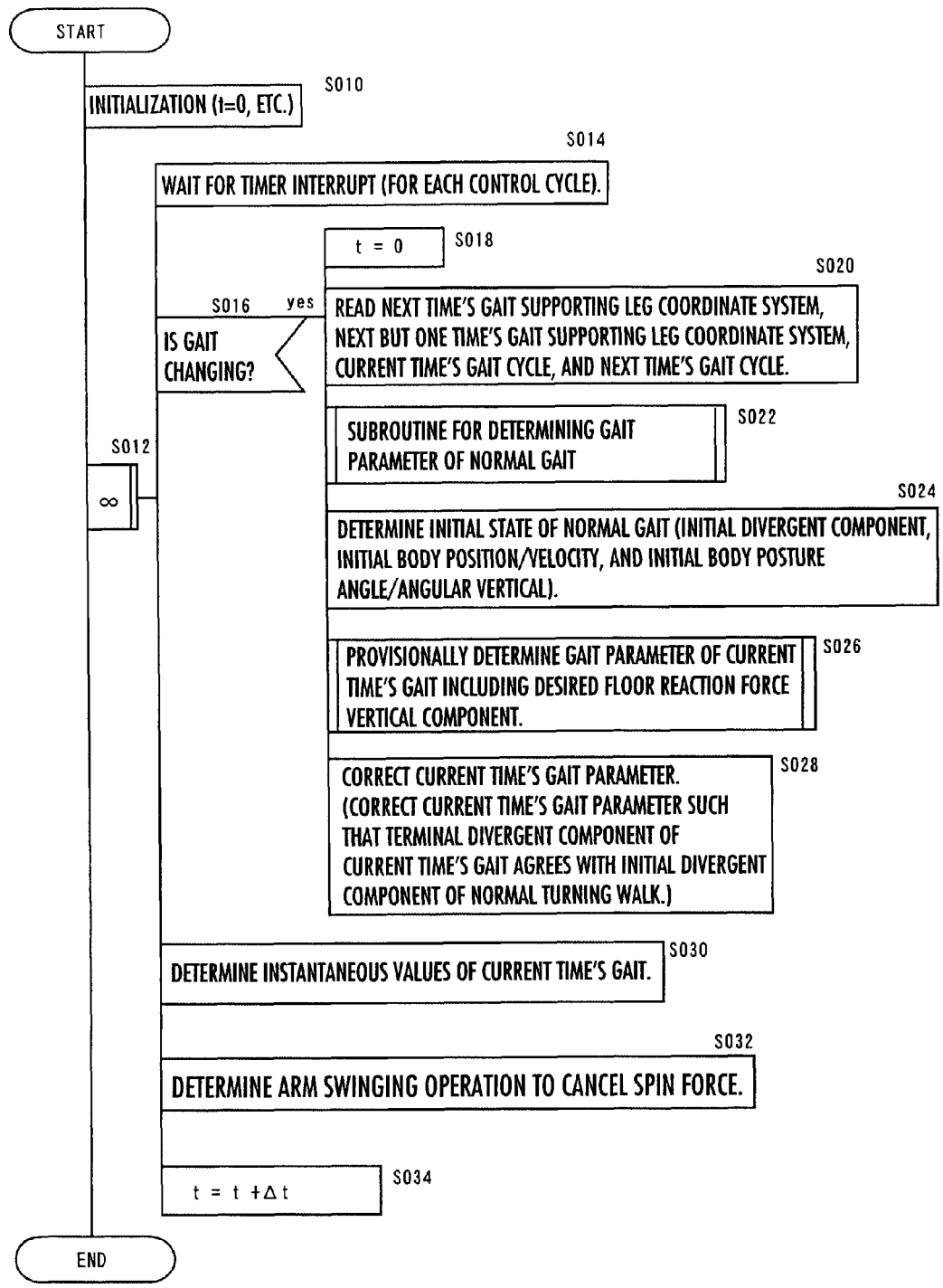
FIG. 8 is a flowchart showing the main routine processing by a gait generator provided in the control unit of FIG. 3.

Referring to FIG. 8 to FIG. 11, the following will explains the details of the processing for generating gaits by the gait generator 100, taking the generation of the running gait shown in FIG. 5 as an example. FIG. 8 is a flowchart (structured flowchart) showing the gait generation processing executed by the gait generator 100.

First, in S010, various types of initializations are performed, including the initialization of time t to zero. This processing is performed when the gait generator 100 is started up or the like. Subsequently, the procedure advances to S014 via S012, and the gait generator 100 waits for a timer interrupt for each control cycle (the calculation processing cycle in the flowchart of FIG. 8). The control cycle is denoted by Δt.

Subsequently, the procedure proceeds to S016 wherein it is determined whether the gait is changing, and if the gait is changing, then the procedure proceeds to S018, or if the gait is not changing, then the procedure proceeds to S030. Here, the aforesaid "the change of a gait" means the timing at which the generation of a current time's gait is begun after the generation of the last time gait has been completed. For example, a control cycle following the control cycle in which the generation of the last time's gait has been completed is the timing of a gait change.

When the procedure proceeds to S018, time t is initialized to zero, then it proceeds to S020 wherein a next time's gait supporting leg coordinate system, a next but one time's gait supporting leg coordinate system, a current time's gait cycle, and a next time's gait cycle are read. These supporting leg coordinate systems and gait cycles are decided by the aforesaid required parameters. More specifically, in the present embodiment, the required parameters supplied from the joystick 44 or the like to the gait generator 100 include the required values of the predicted landing positions/postures of the foot 22 of a free leg (the foot positions/postures in a state wherein, after landing, the foot 22 is rotated without a slippage such that substantially the entire sole thereof is in contact with a floor surface) for the next two steps and predicted landing time. The required value of the first step and the required value of the second step are supplied as the ones corresponding to the current time's gait and the next time's gait, respectively, to the gait generator 100 before the generation of the current time's gait begins (at the gait change timing of S016 mentioned above). Incidentally, these required values can be changed in the middle of the generation of the current time's gait.

Then, the next time's gait supporting leg coordinate system is decided on the basis of the required values of the predicted landing position/posture of the foot 22 of the free leg (the foot 22 of the free leg in the current time's gait) of the first step in the aforesaid required parameters.

Subsequently, the procedure proceeds to S022 wherein the gait generator 100 determines the gait parameter of a normal turning gait as a virtual cyclic gait that follows the current time's gait. The gait parameter includes a foot trajectory parameter that defines a desired foot position/posture trajectory, a reference body posture trajectory parameter that defines a reference body posture trajectory, an arm trajectory parameter that defines a desired arm posture trajectory, a ZMP trajectory parameter that defines a desired ZMP trajectory, and a floor reaction force vertical component trajectory parameter that defines a desired floor reaction force vertical component trajectory in the normal turning gait. Further, a parameter that defines a desired floor reaction force horizontal component permissible range is also included in the gait parameter.

The "normal turning gait" in the present description is used to mean a cyclic gait that does not develop discontinuity in the motion states (the states of foot position/posture, body position/posture, and the like) of the robot 1 at a boundary of gaits (a boundary of gaits for each step in the present embodiment) when the gait is repeated. Hereinafter, "a normal turning gait" will be abbreviated to "a normal gait" in some cases.

Normal turning gaits are provisionally prepared to determine motion states of the robot 1, such as a divergent component, body vertical position/velocity, a body posture angle and the angular velocity thereof, at the terminating end of the current time's gait in the gait generator 100, and are not directly output from the gait generator 100.

Incidentally, "divergence" means that the position of the body 24 of the bipedal mobile robot 1 is undesirably dislocated to a position that is far apart from the positions of both feet 22 and 22. The value of a divergent component is a numeric value that indicates how far the position of the body 24 of the bipedal mobile robot 1 is apart from the positions of both feet 22 and 22 (more specifically, the origin of the global coordinate system (supporting leg coordinate system) set on the ground contacting surface of the foot 22 of a supporting leg).

Figure 9:
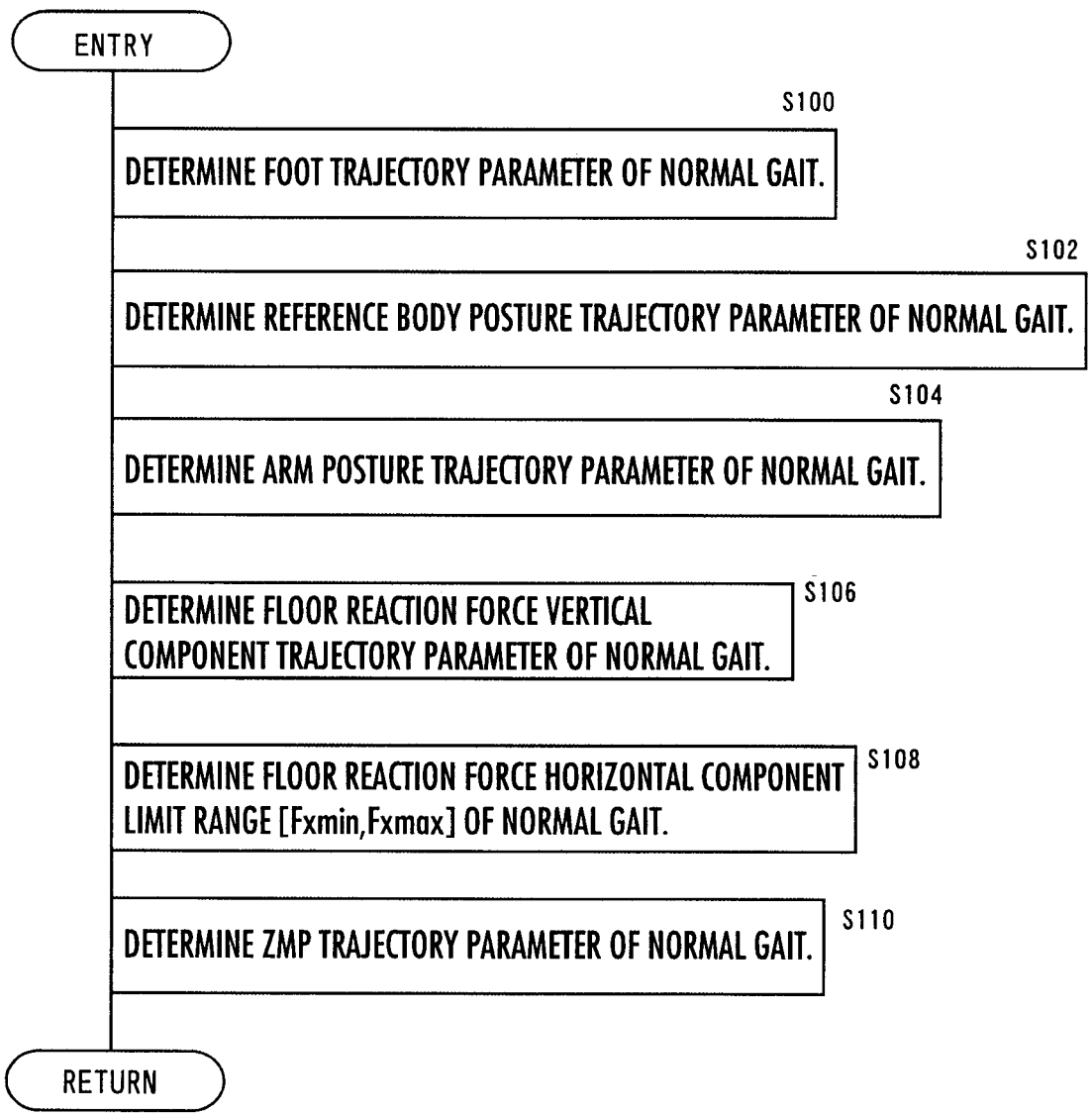
FIG. 9 is a flowchart showing the flowchart subroutine processing of FIG. 8.

Returning to the main subject, in S022, the following processing is carried out according to the flowchart shown in FIG. 9.

First, in S100, a foot trajectory parameter in the gait parameter of the normal gait is determined such that foot position/posture trajectories are connected in the order of a current time's gait, a first turning gait, and a second turning gait. In the explanation hereinafter, the foot 22 of the leg 2 on a supporting leg side will be referred to as a supporting leg foot, while the foot 2 of the leg 2 on a free leg side will be referred to as a free leg foot. Further, "beginning" and "end" of a gait will mean starting time and ending time, respectively, of the gait or instantaneous gaits at those times.

The foot trajectory parameter is composed of the positions/postures of the supporting leg foot and the free leg foot, respectively, at the beginnings and ends, respectively, of the first turning gait and the second turning gait, the gait cycle of each turning gait, and the like. In the foot trajectory parameter, the free leg foot position/posture at the beginning of the first turning gait are defined as the supporting leg foot position/posture at the end of a current time's gait observed from a next time's gait supporting leg coordinate system. In this case, in the running gait, the supporting leg foot 22 at the end of the current time's gait is moving in the air. And the supporting leg foot position/posture at the end of the current time's gait are determined by generating, using the finite-duration setting filter, a foot position/posture trajectory (specifically, a trajectory observed from the next time's gait supporting leg coordinate system) leading from the supporting leg foot position/posture at the beginning of the current time's gait (=the free leg foot position/posture at the end of the last time's gait) to the free leg foot position/posture at the end of the next time's gait, which are determined on the basis of the required values of the predicted landing position/posture of the free leg foot 22 of the second step in the aforesaid required parameters (the required values of the predicted landing position/posture in the next time's gait of the supporting leg foot 22 of the current time's gait) or the next but one time's gait supporting leg coordinate system corresponding to the required values, until the end of the current time's gait.

Subsequently, the procedure proceeds to S102 wherein a reference body posture trajectory parameter that defines the reference body posture trajectory to be followed up by a desired body posture is determined. The reference body posture does not have to be a constant posture as long as it is set to connect at the beginning of the normal gait (the beginning of the first turning gait) and at the end thereof (the end of the second turning gait) (such that the posture angle and its angular velocity of the reference body posture at the beginning of the normal gait agrees with those at the end thereof); however, in the present embodiment, for easier understanding, the reference body posture is set to be an upright posture (vertical posture) throughout the period of the normal gait. Hence, in the present embodiment, the angular velocity and angular acceleration of a posture angle of the reference body posture is zero.

Subsequently, the procedure proceeds to S104 wherein arm posture trajectory parameters, more specifically, arm posture trajectory parameters other than those related to changes in the amounts of angular motions of both arms about a vertical axis (or a body trunk axis) are determined. For example, arm posture trajectory parameters, such as the relative height of the hand of an arm and the relative position of the center-of-gravity of an entire arm with respect to the body 24, are determined. In the present embodiment, the relative position of the center-of-gravity of the entire arm is set such that it is maintained constant with respect to the body.

Subsequently, the procedure proceeds to S106 wherein floor reaction force vertical component trajectory parameters are set. In this case, the floor reaction force vertical component trajectory parameters are set such that the floor reaction force vertical component trajectory defined by the parameters is virtually continuous (values are not skipped in steps), as shown in FIG. 6, in both the first turning gait and the second turning gait. More specifically, a desired floor reaction force vertical component trajectory of a normal turning gait is set according to the pattern shown in FIG. 16. In the pattern, the floor reaction force vertical component in a one-leg supporting period changes in a trapezoidal shape in both the first turning gait and the second turning gait, while the floor reaction force vertical component is maintained at zero in a floating period. And, the time of breakpoints of the pattern and the heights (peak values) of the trapezoidal portions are set as the floor reaction force vertical component trajectory parameters.

Figure 10:
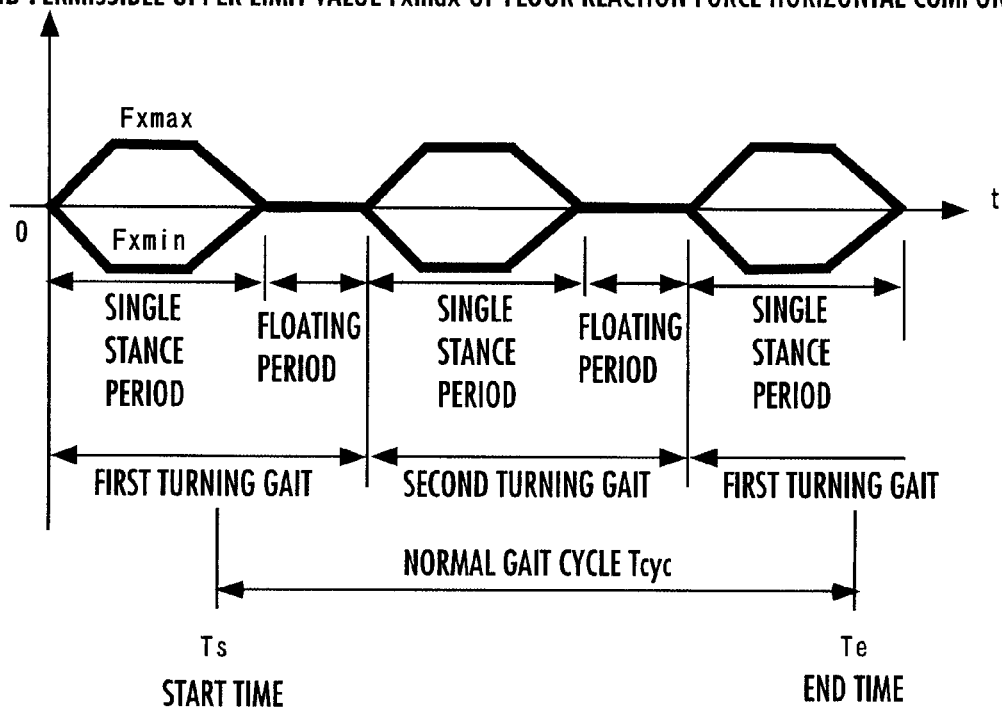
FIG. 10 is a chart showing a setting example of a floor reaction force horizontal component permissible range of a normal gait.
Figure 11:
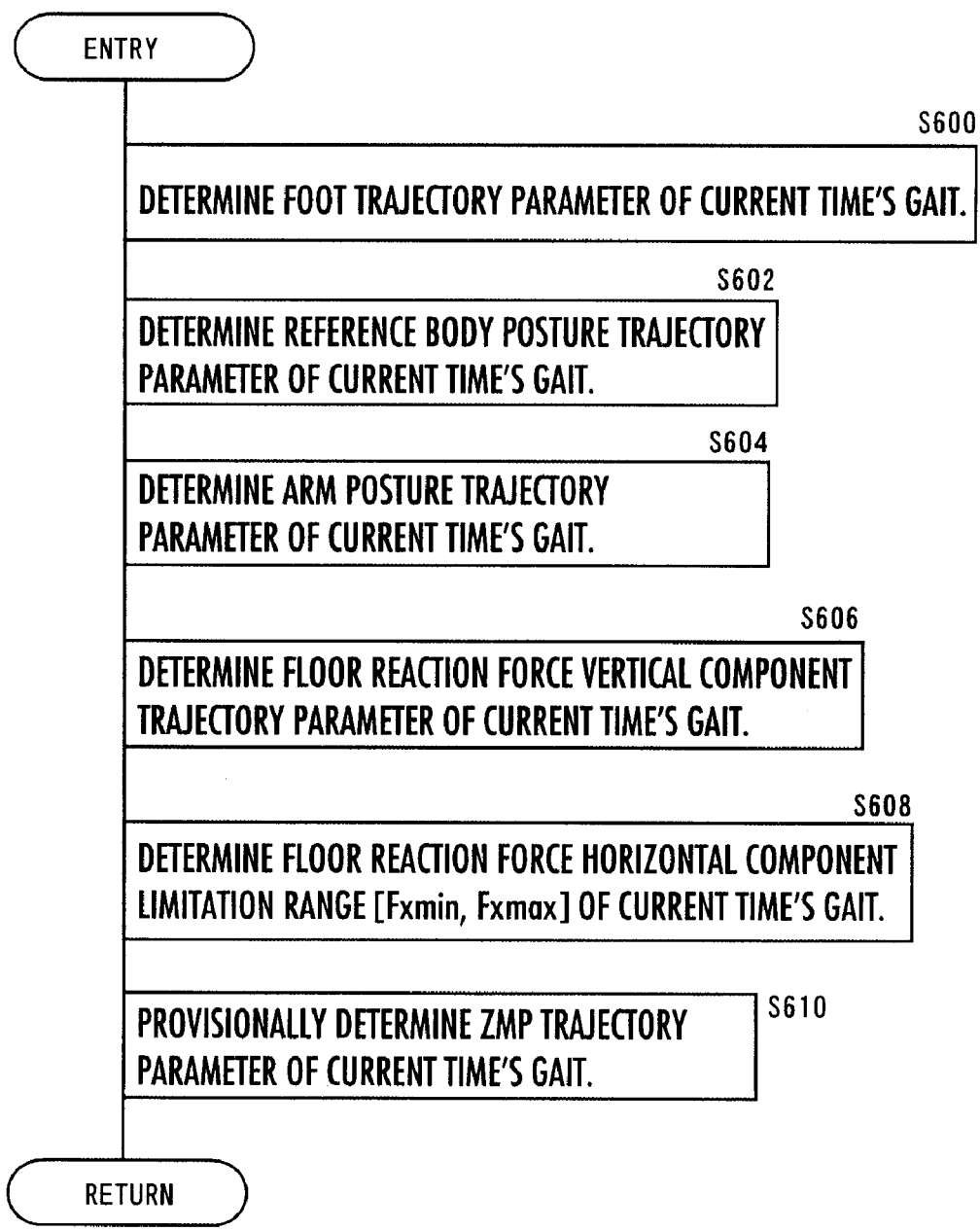
FIG. 11 is a flowchart showing the subroutine processing of the flowchart of FIG. 8.
Figure 16:
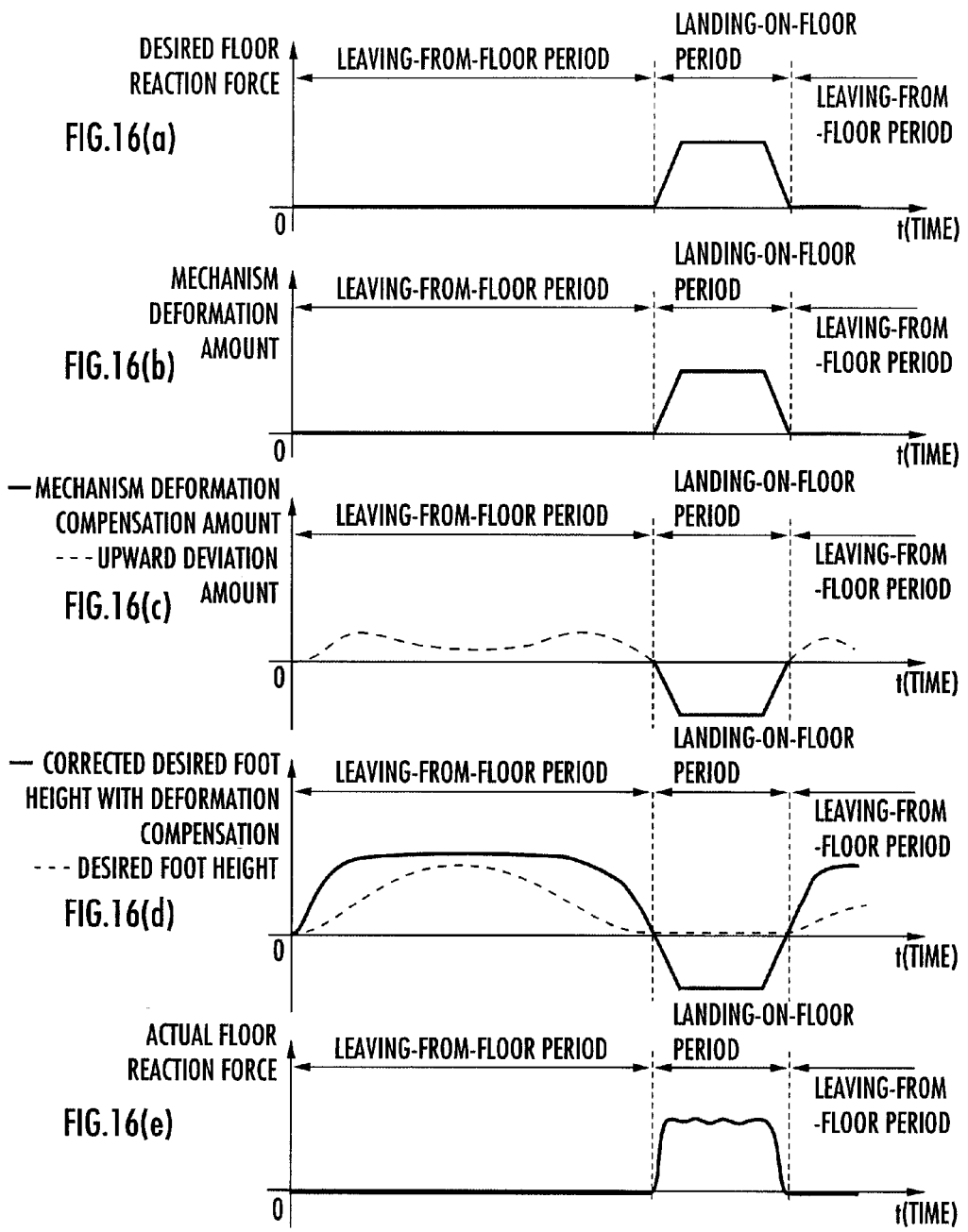
FIG. 16 is an explanatory diagram of the first embodiment of a method for controlling the operation of a leg of a robot in accordance with the present invention.

Subsequently, the procedure proceeds to S108 wherein the permissible range [Fxmin,Fxmax] of floor reaction force horizontal component (more specifically, the parameters that define this) is set, as shown in FIG. 10, on the basis of the floor reaction force vertical component trajectory set as shown in FIG. 16, as described above. The broken line on the negative side in FIG. 10 indicates the permissible lower limit value Fxmin of the floor reaction force horizontal component, while the broken line on the positive side indicates the permissible upper limit value Fxmax of the floor reaction force horizontal component. The method for setting them will be supplementally explained below. The following will explain a case where a floor surface is horizontal.

The floor reaction force horizontal component occurs due to friction between a floor and the foot 22; however, friction that occurs is limited rather than limitless. Hence, in order to prevent the actual robot 1 from slipping when it travels according to a desired gait that has been generated, the floor reaction force horizontal component of the desired gait must always stay within a friction limit. Therefore, in order to satisfy the condition, it has been decided to set a floor reaction force horizontal component permissible range and to generate a desired gait such that the floor reaction force horizontal component of the desired gait lies within the permissible range, as will be discussed later.

If the coefficient of friction between a floor and the foot 22 is denoted by $\mu$, then Fxmin must be always set to be not less than $-\mu$ * floor reaction force vertical component, while Fxmax must be set to be not more than $\mu$ * floor reaction force vertical component. A simplest setting method is to set according to the expressions given below, where ka denotes a positive constant which is smaller than 1.

$Fx\text{min} = -ka*\mu*$ Floor reaction force vertical component $Fx\text{max} = ka*\mu*$ Floor reaction force vertical component  Expression 12

Figure 17:
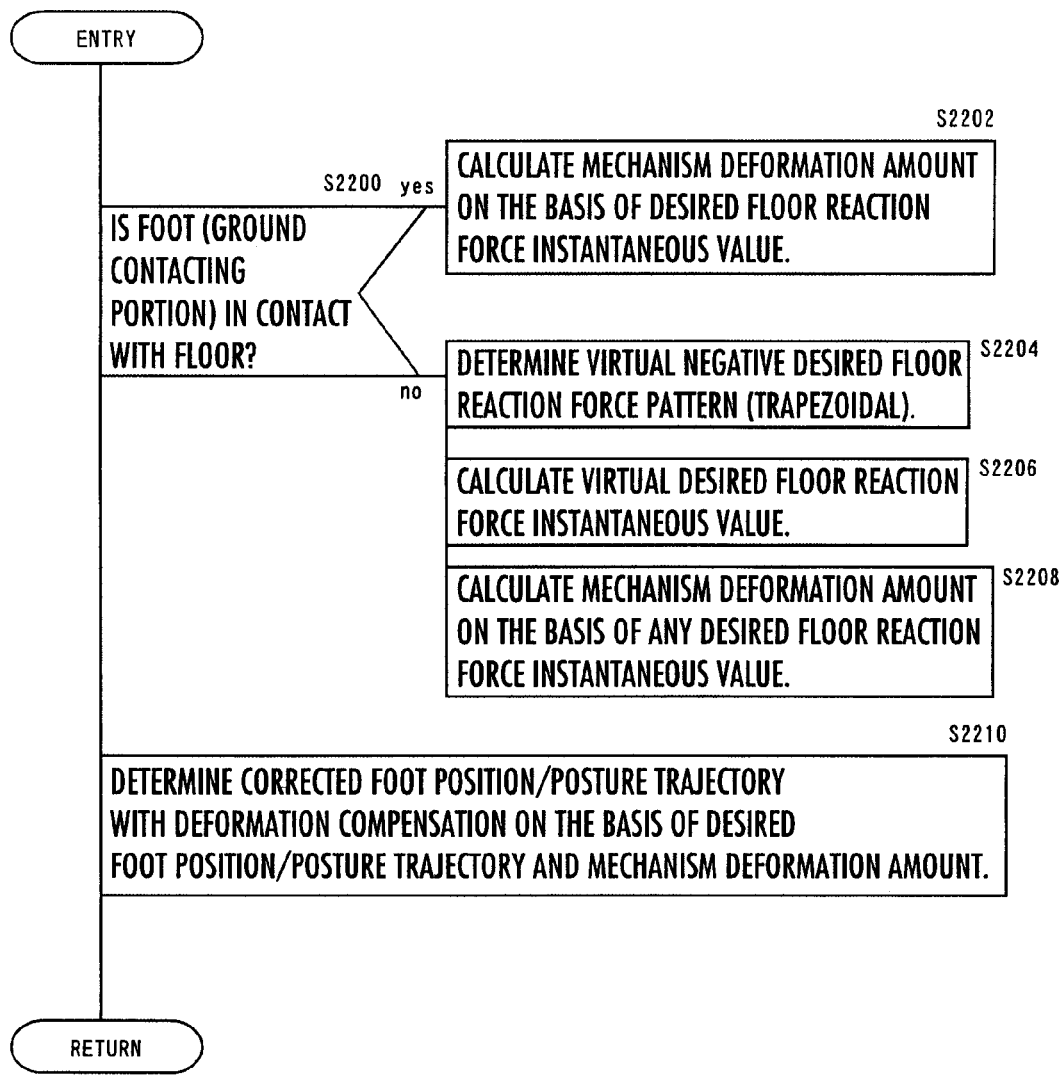
FIG. 17 is an explanatory diagram of a second embodiment of a method for controlling the operation of a leg of a robot in accordance with the present invention.

The floor reaction force horizontal component permissible range in FIG. 17 is an example that has been set according to Expression 12. As the parameters defining a floor reaction force horizontal component permissible range, the values and time of breakpoints of the trapezoidal wave pattern or the like of FIG. 1710 may be set. When determining a floor reaction force horizontal component permissible range according to Expression 12, the values of $(ka*\mu)$ in Expression 12 may be merely set as the parameters.

Subsequently, the procedure proceeds to S110 wherein ZMP trajectory parameters that define the ZMP trajectory of the normal gait combining the first turning gait and the second turning gait are set. In this case, a desired ZMP trajectory is set such that it provides high stability allowance and develops no sudden changes, as described above.

To be more specific, in the running gait shown in FIG. 5, in a while after landing at the heel of the supporting leg foot 22, substantially the entire surface of the sole of the supporting leg foot 22 comes in contact with the ground, and then in a while, only the toe of the supporting leg foot 22 comes in contact with the ground. Then, the robot 1 kicks at the toe of the supporting leg foot 22 to jump into the air and lastly lands at the heel of the free leg foot 22. In addition, a desired ZMP must lie within a ground contacting plane. According to the present embodiment, therefore, the positions of the desired ZMPs in the x-axis direction of the first turning gait and the second turning gait, respectively, of the normal gait are set such that, as shown in the aforesaid upper chart of FIG. 7, they define the heel of the supporting leg foot 22 as their initial position and then remain at that position until substantially the entire surface of the sole of the foot 22 comes in contact with the ground. Then, the desired ZMPs move to the center of the supporting leg foot 22 and further moves to the toe by the time the foot 22 comes in contact with the ground at the toe thereof, and thereafter remains at the toe of the supporting leg foot 22 until leaving the floor. Further thereafter, the desired ZMPs are set such that the desired ZMPs continuously move from the toe of the supporting leg foot 22 to the landing position of the heel of the free leg foot 22 by the time the free leg foot 22 lands next, as described above. And, the time and positions of the breakpoints of the desired ZMP trajectory are set as the ZMP trajectory parameters. In this case, the time of the breakpoints is set on the basis of the gait cycles of the first turning gait and the second turning gait determined on the basis of the aforesaid required parameters, while the positions of the breakpoints are set on the basis of the required values of the predicted landing positions/postures of the free leg feet of the first step and the second step of the required parameters that define the positions/postures on the next time's gait supporting leg coordinate system and the next but one time's gait supporting leg coordinate system or these coordinate systems. The position of the ZMP trajectory in the y-axis direction is set to be the same as that shown in the lower chart of FIG. 7 described above. More specifically, the trajectory of the positions of the desired ZMP in the y-axis direction in the first turning gait is set in the same pattern as that in the lower chart of FIG. 7, and the trajectory of the positions of the desired ZMP in the y-axis direction in the second turning gait is set to be a trajectory which has the same shape as that of the first turning gait and connects to the end of the trajectory.

After the processing shown in S010 to S022 of FIG. 8 is carried out, the procedure proceeds to S024 wherein an initial state of the normal gait is calculated. The initial state calculated here includes an initial body horizontal position/velocity (the initial body position and the initial body velocity in the horizontal direction), an initial body vertical position/velocity (the initial body position and the initial body velocity in the vertical direction), an initial divergent component, and an initial body posture angle and its angular velocity of the normal gait. This calculation of the initial state is exploratorily implemented.

Subsequently, the procedure proceeds to S026 of FIG. 8 wherein a gait parameter of the current time's gait is determined (partly provisionally determined). In S026, more specifically, the following processing is carried out according to the flowchart shown in FIG. 11.

First, in S600, the foot trajectory parameters of the current time's gait are set such that the foot position/posture trajectory of the current time's gait connects to the foot position/posture trajectory of the normal gait.

Subsequently, the procedure proceeds to S602 wherein the reference body posture trajectory parameters of the current time's gait are determined as with the first turning gait or the second turning gait of a normal gait. The aforesaid parameters, however, are set such that the reference body posture trajectory of the current time's gait continuously connects to the reference body posture trajectory of the aforesaid normal gait (the reference body posture angle and the angular velocity at the end of the current time's gait agrees with the reference body posture angle and the angular velocity, respectively, at the beginning of the normal gait). In the present embodiment, the reference body posture is a steady vertical posture in both the current time's gait and the normal gait.

Subsequently, the procedure proceeds to S604 wherein the arm posture trajectory parameters of the current time's gait are determined as with the first turning gait and the second turning gait of the normal gait. The aforesaid parameters, however, are set such that the arm posture trajectory of the current time's gait continuously connects to the arm posture trajectory of the aforesaid normal gait. The arm posture trajectory parameters determined here are the motion parameters other than those related to changes in the angular motion amounts of both arms about the vertical axis (or body trunk axis) and that define the trajectories of the positions of the centers-of-gravity of both arms, as in the case of determining the normal gait parameters (S104 in FIG. 9).

Subsequently, the procedure proceeds to S606 wherein the floor reaction force vertical component trajectory parameters of the current time's gait are set such that the floor reaction force vertical component trajectory defined by the parameters will be a virtually continuous (no skipping of values in steps) trajectory as shown in FIG. 6 described above.

However, the floor reaction force vertical component trajectory parameters are determined such that both the total center-of-gravity vertical position/velocity and the floor reaction force vertical component trajectory of the current time's gait continuously connect to the normal gait.

Figure 12:
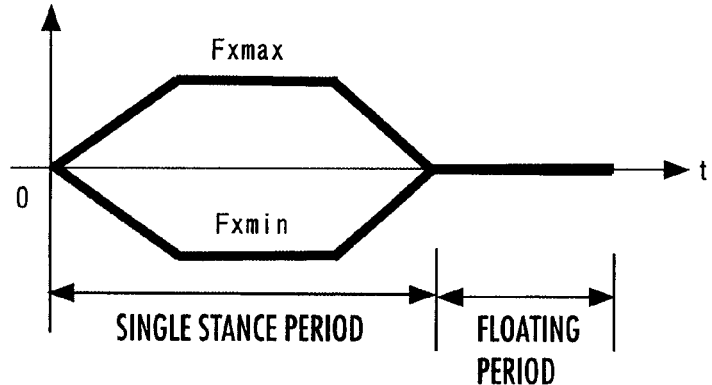
FIG. 12 is a chart showing a setting example of a floor reaction force horizontal component permissible range of a current time's gait.

Subsequently, the procedure proceeds to S608 wherein the floor reaction force horizontal component permissible range [Fxmin, Fxmax] (specifically, the parameter that defines the pattern of the floor reaction force horizontal component permissible range) is set as with the first turning gait or the second turning gait of the normal gait. For example, the floor reaction force horizontal component permissible range is set to have the pattern as shown in FIG. 12. In the present embodiment, the floor reaction force horizontal component permissible range is set on the basis of the aforesaid Expression 12 according to the floor reaction force vertical component pattern previously determined in S606.

Subsequently, the procedure proceeds to S610 wherein the ZMP trajectory of the current time's gait (specifically, the parameters that define the ZMP trajectory, including the time and positions of breakpoints of the trajectory) is set, as shown in aforesaid FIG. 7, such that the ZMP trajectory exhibits a high stability allowance and develops no sudden changes, as with the first turning gait and the second turning gait of the normal gait. The aforesaid parameters, however, are set such that the ZMP trajectory of the current time's gait continuously connects to the ZMP trajectory of the normal gait. In other words, the ZMP trajectory parameters are determined such that the position of the ZMP at the end of the current time's gait coincides with the ZMP position at the beginning of the normal gait. In this case, for a running gait, the time and positions of the breakpoints of the ZMP trajectory in a one-leg supporting period may be set in the same manner as that for setting the ZMP trajectory parameters of the normal gait described above. Further, the ZMP trajectory parameters may be set such that a desired ZMP trajectory in a floating period linearly and continuously changes from the beginning of the floating period to the ZMP position at the beginning of the normal gait.

The ZMP trajectory parameters of the current time's gait determined in S610 are merely provisional and will be corrected, as will be discussed later. For this reason, the ZMP trajectory of the current time's gait that has been set as described above will be referred to as the provisional desired ZMP trajectory of the current time's gait.

The procedure carries out the processing shown in S026 (the processing for determining the gait parameter of the current time's gait), and then proceeds to S028 wherein the gait parameters (ZMP trajectory parameters) of the current time's gait are corrected. In this processing, the ZMP trajectory parameters are corrected to make the body position/posture trajectory continue or approach to the normal gait.

After the current time's gait parameters are corrected in S028, or if a determination result in S016 is NO, then the procedure proceeds to S030 wherein the instantaneous value of the current time's gait is determined on the basis of the corrected parameters of the current time's gait.

Subsequently, the procedure proceeds to S032 wherein the motions of the arms for cancelling a spinning force (for setting a floor reaction force moment vertical component generated about a desired ZMP due to a motion of a portion other than the arms of the robot 1 to approximately zero) are determined. Specifically, the floor reaction force moment vertical component trajectory in a desired ZMP that would be obtained if the arms were not swung (to be exact, the instantaneous values obtained by reversing the signs of the instantaneous values of the trajectory of the vertical components of moments acting on a desired ZMP attributable to the resultant force of gravity and an inertial force of the robot if a gait were generated without swinging arms) is determined. More specifically, an instantaneous value of a floor reaction force moment vertical component about the desired ZMP (instantaneous value) that balances out the instantaneous value of a motion of a gait generated by the processing in S030 (this does not include an arm swinging motion) is determined. Then, this is divided by an equivalent inertial moment of the arm swinging motion to obtain the angular acceleration of the arm swinging motion required to cancel the spinning force. Supplementally, if an excessive arm swing results, then the instantaneous value may be divided by a value that is larger than the equivalent inertial moment.

Subsequently, the angular acceleration is subjected to second-order integration and the calculation result is passed through a low-cut filter for preventing an integration value from becoming excessive, then the obtained angle is defined as the arm swinging motion angle. However, in the arm swinging motion, the right and left arms are swung in directions that are longitudinally opposite from each other so as to maintain the positions of the centers-of-gravity of both arms unchanged. Alternatively, an arm swinging motion for cancelling the spinning force may be generated also in a normal gait beforehand, and an arm swinging motion in the current time's gait may be determined such that this arm swinging motion connects to the above arm swinging motion in the normal gait.

Subsequently, the procedure proceeds to S034 wherein time t for generating a gait is incremented by Δt, then returns to S014 to continue gait generation, as described above.

This concludes the explanation of the processing for generating a desired gait in the gait generator 100.

Referring to FIG. 4, the operations of devices according to the present embodiment will be further explained. In the gait generator 100, a desired gait is generated, as described above. In the generated desired gait, desired body position/posture (trajectory) and desired arm postures (trajectories) are sent out to a robot geometric model (inverse kinematics calculator) 102.

Further, desired foot positions/postures (trajectories), a desired ZMP trajectory (desired total floor reaction force central point trajectory), and a desired total floor reaction force (trajectory) (a desired floor reaction force horizontal component and a desired floor reaction force vertical component) are sent to a composite compliance operation determiner 104 and also to a desired floor reaction force distributor 106. Then, in the desired floor reaction force distributor 106, a floor reaction force is divided between the feet 22R and 22L, and a desired floor reaction force central point of each foot and a desired floor reaction force of each foot are determined. The desired floor reaction force central point of each foot and the desired floor reaction force of each foot that have been determined are sent to the composite compliance operation determiner 104.

The composite compliance operation determiner 104 sends corrected desired foot position/posture with deformation compensation (trajectory) to the robot geometric model 102. Upon receipt of the desired body position/posture (trajectory) and the corrected desired foot position/posture with deformation compensation (trajectory), the robot geometric model 102 calculates joint displacement commands (values) of twelve joints (including 10R(L)) of the legs 2 and 2 that satisfy them, and sends the calculation results to a displacement controller 108. The displacement controller 108 carries out follow-up control on the displacements of the twelve joints of the robot 1, using the joint displacement commands (values) calculated by the robot geometric model 102 as the desired values. In addition, the robot geometric model 102 calculates the displacement commands (values) of the arm joints that satisfy the desired arm postures and sends the calculated commands (values) to the displacement controller 108. The displacement controller 108 carries out follow-up control on the displacements of the twelve joints of the arms of the robot 1, using the joint displacement commands (values) calculated by the robot geometric model 102 as the desired values.

A floor reaction force (specifically, an actual floor reaction force of each foot) generated in the robot 1 is detected by a 6-axis force sensor 34. The detected value is sent to the composite compliance operation determiner 104. Posture inclination errors θerrx and θerry (specifically, an error of an actual posture angle relative to a desired body posture angle, a posture angle error in the roll direction (about x-axis) being denoted by θerrx and a posture angle error in the pitch direction (about the y-axis) being denoted by θerry) that have occurred in the robot 1 are detected through the intermediary of an inclination sensor 36, and the detected values are sent to a posture stabilization control calculator 112. The posture stabilization control calculator 112 calculates a compensating total floor reaction force moment about the desired total floor reaction force central point (desired ZMP) for restoring the body posture angle of the robot 1 to the desired body posture angle, and sends the calculated value to the composite compliance operation determiner 104. The composite compliance operation determiner 104 corrects the desired floor reaction force on the basis of the input value. To be specific, the desired floor reaction force is corrected such that the compensating total floor reaction force moment acts about the desired total floor reaction force central point (desired ZMP).

The composite compliance operation determiner (desired ground contacting portion trajectory correcting means) 104 determines the aforesaid corrected desired foot position/posture with deformation compensation (trajectory) such that the state and the floor reaction force of the actual robot calculated from the sensor detection values or the like agree with the corrected desired floor reaction force. Practically speaking, however, it is impossible to make all states agree with desired values, so that a tradeoff relationship is imparted among them to achieve maximized compromising agreement among them. More specifically, weights are imparted to the control errors of the desired values, and control is carried out to minimize the weighted average of control errors (or squared control errors). With this arrangement, the control is carried out such that actual foot position/posture and total floor reaction force approximately follow the desired foot position/posture and the desired total floor reaction force.

The construction and the operation of the aforesaid composite compliance operation determiner 104 and the like are described in detail in, for example, Japanese Patent Laid-Open Publication No. H10-277969 previously applied by the present applicant, so that no further explanation will be given.

The generation of a walking gait of the robot 1 will now be explained. The walking gait is a gait which includes no floating period and in which the one-leg supporting period and the two-leg supporting period are alternately repeated.

To generate a walking gait, the processing described below is carried out in S106 and S606. A floor reaction force vertical component trajectory is determined such that the amounts of characteristics, such as a phase and an amplitude, of a body vertical position trajectory (body vertical position trajectory using, for example, the body height determining technique disclosed in Japanese Patent Laid-Open Publication No. H10-86080 by the present applicant) determined on the basis of a geometric condition (geometric restrictive condition) related to at least the displacements of the joints of the legs, such as whether knee bending angles are appropriate, are satisfied as much as possible.

Thus, the major part of algorithm for generating gaits can be shared among running and walking, making it possible to shift to running in the middle of walking or to shift to walking in the middle of running.

Figure 14:
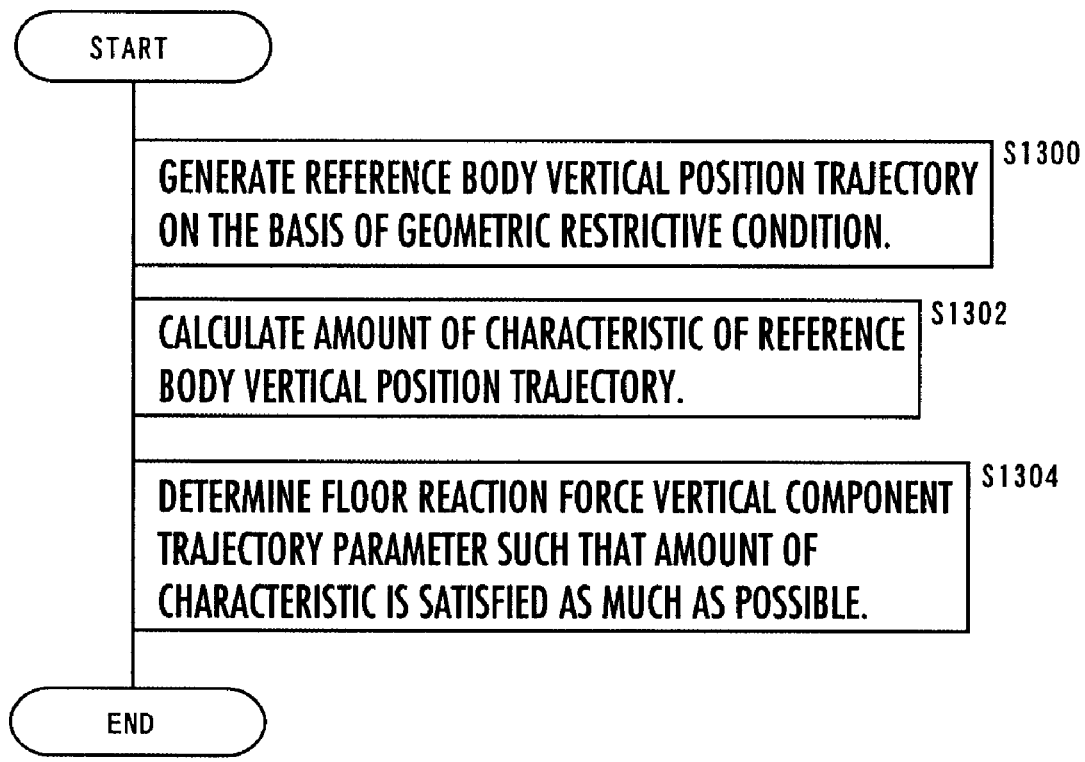
FIG. 14 is a flowchart illustrating the processing for setting the desired floor reaction force vertical component in the walking gait.

The processing will be explained in conjunction with FIG. 14. First, in S1300, a body vertical position trajectory that satisfies a predetermined geometric restrictive condition related to at least the displacements of the joints of the legs 2 is determined using the body height determining method previously proposed in Japanese Patent Laid-Open Publication No. H10-86080 by the present applicant. Hereinafter, this will be referred to as the reference body vertical position trajectory. To be more specific, first, based on the foot trajectory parameters, the desired ZMP trajectory parameters and the like that have been determined on the basis of required parameters, a body horizontal position trajectory is determined using the first embodiment of Japanese Patent Application No. 2000-352011 previously proposed by the present applicant. In this case, the body horizontal position trajectory is determined such that the floor reaction force vertical component agrees with the self-weight of the robot 1 and the horizontal component of a floor reaction force moment about a desired ZMP becomes zero, the body vertical position taking a preset constant value. The body posture trajectory at this time may be, for example, a trajectory of a constant posture (e.g., a vertical posture).

Subsequently, using the body height determining method previously proposed by the present applicant (Japanese Patent Laid-Open Publication No. H10-86080. More specifically, the technique shown in FIG. 6 of the Publication or the like), a body vertical position trajectory is calculated on the basis of a foot trajectory determined by foot trajectory parameters, and the body horizontal position trajectory and the body posture trajectory determined as described above, and the calculated result is defined as the aforesaid reference body vertical position trajectory.

Subsequently, the procedure proceeds to S1302 to calculate (extract) the amounts of characteristics, such as an amplitude and a phase, of a reference body vertical position trajectory in order to determine a floor reaction force vertical component trajectory that makes it possible to generate a desired body vertical position trajectory that is similar to the reference body vertical position trajectory as much as possible. For instance, the amplitude (the difference between a minimum value and a maximum value) of the reference body vertical position trajectory is calculated as the amount of characteristic.

Figure 13:
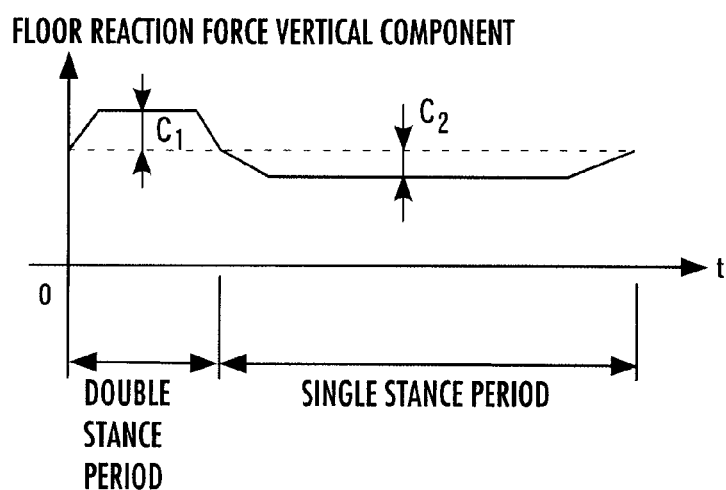
FIG. 13 is a chart showing a setting example of a desired floor reaction force vertical component in a walking gait.

Subsequently, the procedure proceeds to S1304 wherein the floor reaction force vertical component trajectory parameters (the time of breakpoints and the values of a floor reaction force vertical component) are determined such that the body vertical position trajectory generated on the basis of the floor reaction force vertical component trajectory parameters can satisfy the aforesaid amount of characteristic as much as possible (present a pattern similar to the aforesaid reference body vertical position trajectory as much as possible). To be more specific, in the case of a walking gait, the first turning gait and the second turning gait of a normal gait and the floor reaction force vertical component trajectory of a current time's gait are set to look like, for example, the broken-line pattern shown in FIG. 13. They are set to be shaped like a trapezoid bulging toward a floor reaction force vertical component increasing side (bulging upward) in a two-leg supporting period, while they are set to be shaped like a trapezoid bulging toward a floor reaction force vertical component decreasing side (bulging downward). Then, floor reaction force vertical component trajectory parameters, such as heights C1 and C2 of the two trapezoids of the floor reaction force vertical component trajectory, are determined such that the difference between the maximum value and the minimum value of the body vertical position trajectory corresponding to the total center-of-gravity vertical position trajectory of the robot 1 obtained by subjecting the floor reaction force vertical component trajectory to second-order integration from the beginning of the gait (the start time of the two-leg supporting period) to the end thereof (the end time of the one-leg supporting period) agrees with the aforesaid amount of characteristic (in this example, the time of breakpoints of the floor reaction force vertical component trajectory is determined on the basis of a required parameter related to a gait cycle).

However, the parameters of the floor reaction force vertical component trajectory of the normal gait are determined to also satisfy the following condition, as described above.

(Condition) The mean value throughout a normal gait period (the period of both the first turning gait and the second turning gait) of a floor reaction force vertical component trajectory agrees with the self-weight of the robot. In other words, the mean value of the floor reaction force vertical components has the same magnitude as that of gravity acting on the robot and is in the opposite direction therefrom.

The parameters of a floor reaction force vertical component trajectory of the current time's gait are determined such that the body (total center-of-gravity) vertical position trajectory continuously connects or approaches to the normal gait, as previously described.

Thus, the desired floor reaction force vertical component trajectory (the parameters defining this) in the walking gait is determined. The processing for generating gait other than the processing for determining the desired floor reaction force vertical component trajectory explained above may be the same as that in the embodiment related to the running gait described above.

A considerable amount of calculation is required to determine a reference body vertical position trajectory as described above; therefore, as an alternative, a map showing a relationship between motion parameters (e.g., foot trajectory parameters) and the characteristic amount of a body (total center-of-gravity) vertical position trajectory (e.g., amplitude) of a normal gait may be prepared and stored in advance, and the amount of characteristic may be determined on the basis of supplied normal gait parameters by referring to the above map.

Instead of the arm swinging operation for cancelling a spinning force in S032 of FIG. 8 described above, an operation may be performed to rotate (twist) the body 24 about the body trunk axis (or the vertical axis) thereof. Alternatively, the arm swinging operation may be combined with the operation for rotating (twisting) the body 24 about the body trunk axis (or the vertical axis) thereof.

The invention of the present application is characterized in that the operation of the leg 2 is controlled such that the foot 22 at the shift from the leaving-from-floor period of the foot 22 (=the free-leg period of the leg 2) to the landing-on-floor period (=the landing period of the leg 2) has a predetermined velocity in the vertical direction downward or the direction perpendicular to a floor surface downward so as to compensate for the deformation amount of the compliance mechanism 42 when a desired floor reaction force acts on the foot 22. This characteristic will be explained in conjunction with FIG. 15 to FIG. 18.

Figure 15:
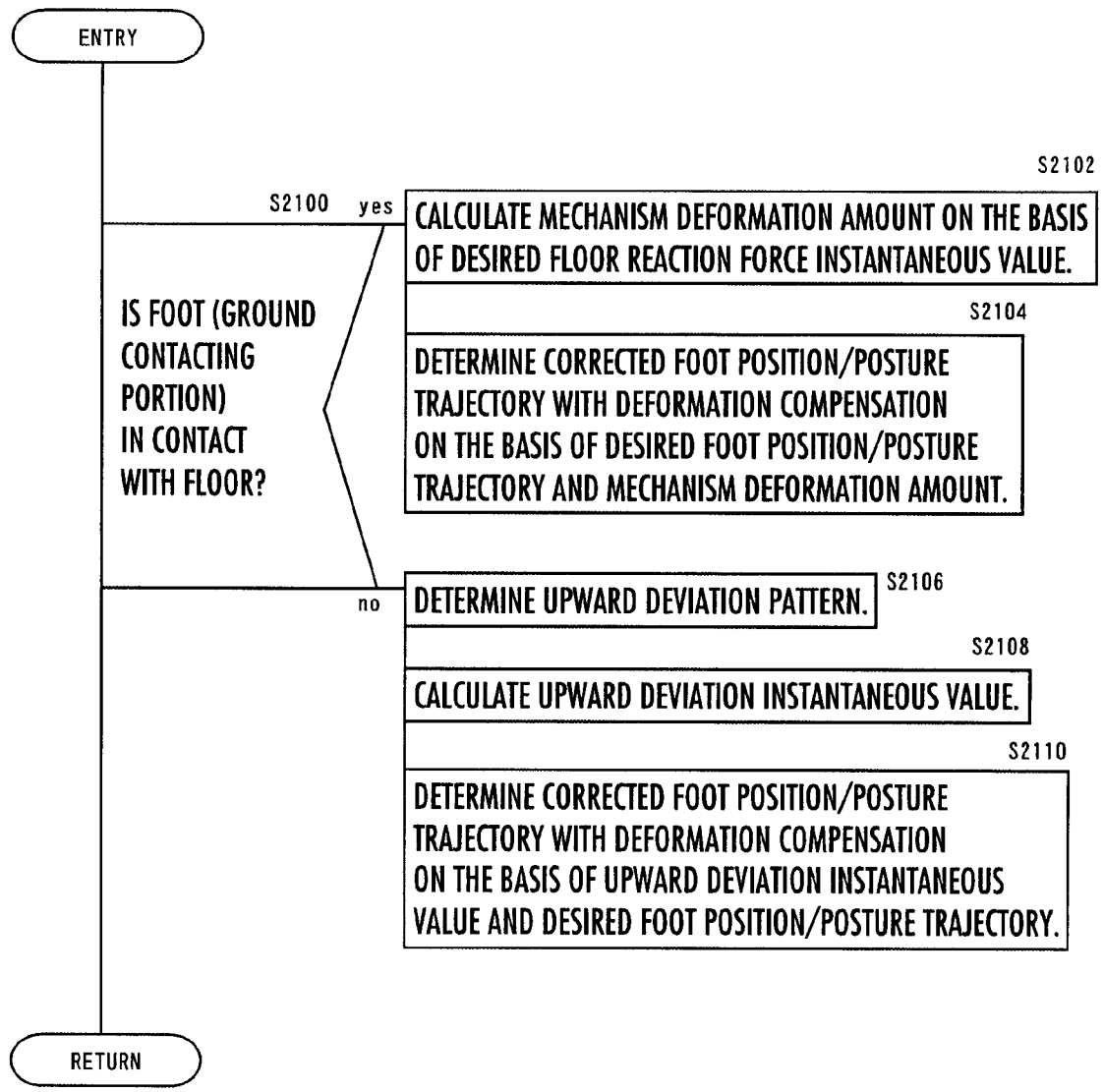
FIG. 15 is an explanatory diagram of a first embodiment of a method for controlling the operation of a leg of a robot in accordance with the present invention.

A first embodiment of the method for controlling the operation of the leg 2 will be explained by using FIG. 15 and FIG. 16.

First, it is determined whether the foot (the ground contacting portion) 22 is in contact with a floor, that is, whether it is the landing-on-floor period or the leaving-from-floor period (S2100).

If it is determined that the period is the landing-on-floor period (S2100 . . . YES), then a mechanism deformation amount of the compliance mechanism 42 is calculated on the basis of a desired floor reaction force instantaneous value as a desired instantaneous value of a floor reaction force acting on the foot 22 (S2102). Then, a corrected foot position/posture trajectory with deformation compensation is determined on the basis of a desired foot position/posture trajectory and the mechanism deformation amount (S2104).

Specifically, based on the component in the vertical direction or the component in the direction perpendicular to a floor surface of the desired floor reaction force (instantaneous value) in the landing-on-floor period shown in FIG. 16(*a*), the component in the vertical direction or the component in the direction perpendicular to a floor surface of the mechanism deformation amount in the landing-on-floor period is calculated such that the component is continuously increased from zero after the start of the landing-on-floor period, maintained constant, and then continuously decreased to zero by the end of the landing-on-floor period, as shown in FIG. 16(b). Further, based on the component in the vertical direction or the component in the direction perpendicular to a floor surface of the mechanism deformation amount in the landing-on-floor period shown in FIG. 16(b), the component in the vertical direction or the component in the direction perpendicular to a floor surface of the mechanism deformation compensation amount in the landing-on-floor period is calculated such that the component is continuously decreased from zero after the start of the landing-on-floor period, maintained constant, and then continuously increased to zero by the end of the landing-on-floor period, as indicated by the solid line in FIG. 16(c).

Further, based on the desired foot height (the determined foot trajectory parameter of the current time's gait (S600)) in the landing-on-floor period, which has been set to zero, as indicated by the dashed line in FIG. 16(d), and the component in the vertical direction or the component in the direction perpendicular to a floor surface of the mechanism deformation compensation amount in the landing-on-floor period indicated by the solid line in FIG. 16(c), the corrected desired foot height with deformation compensation in the landing-on-floor period is determined such that it is continuously decreased from zero after the start of the landing-on-floor period, maintained constant, and then continuously increased to zero by the end of the landing-on-floor period, as indicated by the solid line in FIG. 16(d).

Meanwhile, if it is determined that the period is the leaving-from-floor period (NO . . . S2100), then an upward shift pattern is determined (S2106), an upward shift instantaneous value is calculated (S2108), and a corrected foot position/posture trajectory with deformation compensation is determined on the basis of the instantaneous value of the upward shift and a desired foot position/posture trajectory (S2110).

Specifically, the upward shift amount of the foot 22 in the leaving-from-floor period is determined such that it is increased from zero and slightly decreased after the start of the leaving-from-floor period, increased again, and then decreased to zero by the end of the leaving-from-floor period, as indicated by the dashed line in FIG. 16(c). Then, based on the upward shift amount (instantaneous value) indicated by the dashed line in FIG. 16(c) and the desired foot height (S600) in the leaving-from-floor period set as indicated by the dashed line in FIG. 16(d), the corrected desired foot height with deformation compensation in the leaving-from-floor period is determined such that it is continuously increased from zero after the start of the landing-on-floor period, maintained constant, and then continuously decreased to zero by the end of the landing-on-floor period, as indicated by the solid line in FIG. 16(d).

In the first embodiment, the desired foot height (refer to the dashed line in FIG. 16(d)) is corrected downward in terms of the component of a mechanism deformation compensation amount in the vertical direction or the component thereof in the direction perpendicular to the floor surface in the landing-on-floor period while it is corrected upward on the basis of an upward shift amount (refer to the dashed line in FIG. 16(c)) in the leaving-from-floor period, and these corrected desired foot heights are set as the corrected desired heights that smoothly and continuously change immediately before and after the shift from the leaving-from-floor period to the landing-on-floor period and also immediately before and after the shift from the landing-on-floor period to the leaving-from-floor period, as indicated by the solid line in FIG. 16(d). Furthermore, a corrected desired height is set such that, at the instant of landing, the component of the velocity of the foot (ground contacting portion) 22 in the vertical direction or the component thereof in the direction perpendicular to a floor surface relative to the floor surface has a ratio in the range of [0.1, 10] with respect to the absolute value of a change rate of the component of the mechanism deformation amount of the compliance mechanism in the vertical direction or the component thereof in the direction perpendicular to the floor surface, which occurs due to a desired floor reaction force immediately after landing.

Then, the operations of the right and left legs 2 are controlled by the joint displacement controller 108 or the like on the basis of a foot height (a corrected desired position/posture trajectory with deformation compensation) set by the composite compliance control unit 104.

With this arrangement, the component in the vertical direction or the component in the direction perpendicular to the floor surface of an actual floor reaction force acting on the foot 22 will change, closely following the component of a desired floor reaction force of the foot 22 (refer to FIG. 16(a)) in the vertical direction or the component thereof in the direction perpendicular to the floor surface, as shown in FIG. 16(e). This makes it possible to obviate a situation in which an impact to the robot 1 immediately after the shift to the non-ground-contacting period to the ground-contacting period becomes excessive or a part of the foot 22 is caught on a floor surface due to unsmooth unloading at the shift from the ground-contacting period to the non-ground-contacting period, as shown in FIG. 19(e), thus permitting stable control of the robot 1. In other words, according to the robot of the first embodiment of the present invention, a force with which a leg of the robot 1 in travel firmly stands on a floor surface can be properly controlled according to a landing impact easing characteristic of the compliance mechanism 42 from a viewpoint of easing an impact to a leg at the time of landing and preventing a part of a foot of a leg from being caught on a floor at the time of leaving the floor.

A second embodiment of the method for controlling the operations of the legs 2 will be explained in conjunction with FIG. 17 and FIG. 18.

First, it is determined whether the foot (the ground contacting portion) 22 is in contact with a floor, that is, whether the foot 22 is in the landing-on-floor period or the leaving-from-floor period (S2200).

If it is determined that the foot 22 is in the landing-on-floor period (S2200 . . . YES), then a mechanism deformation amount is calculated on the basis of a desired floor reaction force instantaneous value (S2202), then a corrected foot position/posture trajectory with deformation compensation is determined on the basis of a desired foot position/posture trajectory and the mechanism deformation amount (S2210).

Specifically, based on the component of the desired floor reaction force (instantaneous value) in the vertical direction or the component thereof in the direction perpendicular to a floor surface in the landing-on-floor period shown in FIG. 18(a), the component of the mechanism deformation amount in the vertical direction or the component thereof in the direction perpendicular to a floor surface in the landing-on-floor period is calculated such that the component is continuously increased from zero after the start of the landing-on-floor period, maintained constant, and then continuously decreased to zero by the end of the landing-on-floor period, as shown in FIG. 18(b). Further, based on the component of the mechanism deformation amount in the vertical direction or the component thereof in the direction perpendicular to a floor surface in the landing-on-floor period shown in FIG. 18(b), the component of the mechanism deformation compensation amount in the vertical direction or the component thereof in the direction perpendicular to a floor surface in the landing-on-floor period is calculated such that the component is continuously decreased from zero after the start of the landing-on-floor period, maintained constant, and then continuously increased to zero by the end of the landing-on-floor period, as shown in FIG. 18(c).

Further, based on the desired foot height (the determined foot trajectory parameter of the current time's gait (S600)) in the landing-on-floor period, which has been set to zero, as indicated by the dashed line in FIG. 18(d), and the component of the mechanism deformation compensation amount in the vertical direction or the component thereof in the direction perpendicular to a floor surface in the landing-on-floor period indicated by the solid line in FIG. 18(c), the corrected desired foot height with deformation compensation in the landing-on-floor period is determined such that it is continuously decreased from zero after the start of the landing-on-floor period, maintained constant, and then continuously increased to zero by the end of the landing-on-floor period, as indicated by the solid line in FIG. 18(d).

Meanwhile, if it is determined that the foot 22 is in the leaving-from-floor period (NO . . . S2200), then a virtual negative desired floor reaction force pattern is determined (S2204), the instantaneous value of a virtual desired floor reaction force is calculated (S2206), and a mechanism deformation amount is calculated on the basis of any desired floor reaction force instantaneous value (S2208), and then a corrected foot position/posture trajectory with deformation compensation is determined on the basis of the desired foot position/posture trajectory and the mechanism deformation amount (S2210).

Specifically, as shown in FIG. 18(a), the component of a desired floor reaction force (instantaneous value) in the vertical direction or the component thereof in the direction perpendicular to the floor surface is determined such that, in the leaving-from-floor period, the component is continuously decreased from zero in a virtual manner after the start of the leaving-from-floor period, increased, decreased again, and then continuously increased to zero by the end of the leaving-from-floor period. Further, based on the component of the virtual negative desired floor reaction force shown in FIG. 18(a) in the vertical direction or the component thereof in the direction perpendicular to the floor surface, the component of the mechanism deformation amount in the vertical direction or the component thereof in the direction perpendicular to the floor surface in the leaving-from-floor period is calculated such that it is continuously decreased from zero after the start of the leaving-from-floor period, increased, decreased again, and then continuously increased to zero by the end of the leaving-from-floor period, as shown in FIG. 16(b). Further, based on the component of the mechanism deformation amount in the vertical direction or the component thereof in the direction perpendicular to the floor surface in the leaving-from-floor period shown in FIG. 18(b), the component of the mechanism deformation compensation amount in the vertical direction or the component thereof in the direction perpendicular to the floor surface in the leaving-from-floor period is calculated such that it is continuously increased from zero after the start of the leaving-from-floor period, decreased, increased again, and then continuously decreased to zero by the end of the leaving-from-floor period, as shown in FIG. 18(c).

Further, based on the desired foot height (the determined foot trajectory parameter of the current time's gait (S600)) in the leaving-from-floor period indicated by the dashed line in FIG. 18(d), and the component of the mechanism deformation compensation amount in the vertical direction or the component thereof in the direction perpendicular to a floor surface in the leaving-from-floor period shown in FIG. 18(c), the corrected desired foot height with deformation compensation in the leaving-from-floor period is determined such that it is continuously increased from zero after the start of the landing-on-floor period, maintained constant, and then continuously decreased to zero by the end of the leaving-from-floor period, as indicated by the solid line in FIG. 18(d).

In the second embodiment, the desired foot height (refer to the dashed line in FIG. 18(d)) is corrected downward in terms of the component of a mechanism deformation compensation amount in the vertical direction or the component thereof in the direction perpendicular to the floor surface (refer to FIG. 18(c)), the mechanism deformation compensation amount being based on a positive desired floor reaction force (refer to FIG. 18(a)) in the landing-on-floor period while it is corrected upward in terms of the component of a mechanism deformation compensation amount in the vertical direction or the component thereof in the direction perpendicular to the floor surface (refer to FIG. 18(c)), the mechanism deformation compensation amount being based on a virtual negative desired floor reaction force (refer to FIG. 18(a)) in the leaving-from-floor period, and these corrected desired foot heights are set as the corrected desired heights that smoothly and continuously change immediately before and after the shift from the leaving-from-floor period to the landing-on-floor period and also immediately before and after the shift from the landing-on-floor period to the leaving-from-floor period, as indicated by the solid line in FIG. 18(d). Furthermore, a corrected desired height is set such that, at the instant of landing, the component of the velocity of the foot (ground contacting portion) 22 in the vertical direction or the component thereof in the direction perpendicular to a floor surface in relation to the floor surface has a ratio in the range of [0.1, 10] with respect to the absolute value of a change rate of the component of the mechanism deformation amount of the compliance mechanism in the vertical direction or the component thereof in the direction perpendicular to the floor surface, which occurs due to a desired floor reaction force immediately after landing.

Then, the operations of the right and left legs 2 are controlled by the joint displacement controller 108 or the like on the basis of a foot height (a corrected desired position/posture trajectory with deformation compensation) set by the composite compliance control unit 104.

With this arrangement, the component of an actual floor reaction force in the vertical direction or the component thereof in the direction perpendicular to the floor surface, the actual floor reaction force acting on the foot 22, will change, closely following the component of a desired floor reaction force of the foot 22 in the vertical direction or the component thereof in the direction perpendicular to the floor surface (refer to FIG. 18(a)), as shown in FIG. 18(e). This makes it possible to obviate a situation in which an impact to the robot 1 immediately after the shift to the leaving-from-floor period to the landing-on-floor period becomes excessive or a part of the foot 22 is caught on a floor surface due to unsmooth unloading at the shift from the landing-on-floor period to the leaving-from-floor period, as shown in FIG. 19(e), thus permitting stable control of the robot 1. In other words, according to the robot in accordance with the present invention, a force with which a leg of the robot 1 in travel firmly stands on a floor surface can be properly controlled according to a landing impact easing characteristic of the compliance mechanism 42 from a viewpoint of easing an impact to a leg at the time of landing and preventing a part of a foot of a leg from being caught on a floor at the time of leaving the floor.

The velocity of the foot 22 in the vertical direction downward or the direction perpendicular to the floor surface downward at the instant of landing with respect to the absolute value of a change rate of the amount of deformation of the compliance mechanism 42 in the vertical direction or the direction perpendicular to the floor surface that occurs immediately after the landing of the foot (the ground contacting portion) 22 of the leg 2 caused by a desired floor reaction force is a factor influencing an impact to the leg 2 at the time of landing on a floor and unloading at the time of leaving the floor. The inventor of the present applicant has found that, if the rate is below "0.1," the capability for reducing an impact to the leg 2 at the time of landing on the floor suddenly deteriorates and unloading at the time of leaving the floor also deteriorates, leading to a sudden increase in the possibility of a part of the foot 22 being caught on the floor surface. On the other hand, if the rate exceeds "10," the possibility increases in which a load on the leg 2 at the time of landing on the floor exceeds, although temporarily, a maximum value of a desired floor reaction force, whereas unloading at the time of leaving the floor is smooth. Accordingly, based on the findings, the operation of the leg 2 is controlled such that the rate falls within [0.1, 10], thereby permitting smooth unloading at the time of leaving the floor while easing an impact to the leg 2 when landing on the floor. This makes it possible to stably control the operation of the robot 1.

The invention claimed is:

1. A legged mobile robot which has a base body, a plurality of legs extended downward from the base body, and a compliance mechanism for easing a landing impact to each leg, and which travels by motions of each leg, involving the landing and leaving of a ground contacting portion of a distal end of each leg onto and from a floor, comprising:
  a leg controlling means which controls the operation of the leg such that a ground contacting portion lands onto a floor at a predetermined velocity in a vertical direction downward or in a direction perpendicular to the floor surface downward, and
  a desired floor reaction force setting means which sets a desired value of a floor reaction force acting on the ground contacting portion as a desired floor reaction force, wherein the leg controlling means determines the predetermined velocity on the basis of the change rate of the amount of deformation of the compliance mechanism in the vertical direction or the direction perpendicular to the floor surface, which occurs immediately after the landing of the ground contacting portion of the leg due to the desired floor reaction force set by the desired floor reaction force setting means, and controls the motions of the leg such that the velocity of the ground contacting portion in the vertical direction downward or the direction perpendicular to the floor surface downward reaches the predetermined velocity by the landing.

2. The legged mobile robot according to claim 1, wherein the leg controlling means controls the motions of the leg such that the predetermined velocity takes a ratio falling within a range of [0.1, 10] relative to the absolute value of a change rate of the amount of deformation of the compliance mechanism in the vertical direction or the direction perpendicular to the floor surface, which occurs immediately after the landing of the ground contacting portion of the leg due to the desired floor reaction force set by the desired floor reaction force setting means.

3. The legged mobile robot according to claim 1, comprising:
  a mechanism deformation amount determining means which determines the amount of deformation of the compliance mechanism occurring due to a desired floor reaction force set by the desired floor reaction force setting means as a mechanism deformation amount;
  desired ground contacting portion trajectory setting means which sets a desired position of a ground contacting portion of a leg as a desired ground contacting portion trajectory; and
  a desired ground contacting portion trajectory correcting means which corrects the desired ground contacting portion trajectory set by the desired ground contacting portion trajectory setting means so as to compensate for an influence of a mechanism deformation amount determined by the mechanism deformation amount determining means exerted on the desired ground contacting portion trajectory,
  wherein the leg controlling means controls the motion of a leg such that the velocity of the ground contacting portion in the vertical direction downward or the direction perpendicular to the floor surface downward reaches the predetermined velocity by the landing on the basis of a change rate of a component of the mechanism deformation amount in the vertical direction or a component thereof in the direction perpendicular to a floor surface immediately after the landing of the ground contacting portion determined by the mechanism deformation amount determining means in a leaving-from-floor period of the ground contacting portion, and also controls the motion of the leg on the basis of a corrected desired ground contacting portion trajectory provided by a desired ground contacting portion trajectory correcting means in a landing-on-floor period of the ground contacting portion.

4. The legged mobile robot according to claim 3, wherein the desired ground contacting portion trajectory correcting means corrects a component of a desired ground contacting portion trajectory in the vertical direction or a component thereof in the direction perpendicular to a floor surface set by the desired ground contacting portion trajectory setting means such that the component is shifted upward on the basis of a mechanism deformation amount immediately after the ground contacting portion lands, which has been determined by the mechanism deformation amount determining means, in a leaving-from-floor period of the ground contacting portion, while the component is shifted downward on the basis of a mechanism deformation amount set by the mechanism deformation amount determining means in a landing-on-floor period of the ground contacting portion.

5. The legged mobile robot according to claim 1, comprising:
  a mechanism deformation amount determining means which determines the amount of deformation of the compliance mechanism occurring due to a desired floor reaction force set by the desired floor reaction force setting means as a mechanism deformation amount;
  desired ground contacting portion trajectory setting means which sets a desired position of a ground contacting portion of a leg as a desired ground contacting portion trajectory; and
  a desired ground contacting portion trajectory correcting means which determines a corrected desired ground contacting portion trajectory by correcting the desired ground contacting portion trajectory set by the desired ground contacting portion trajectory setting means so as to compensate for an influence of a mechanism deformation amount determined by the mechanism deformation amount determining means exerted on the desired ground contacting portion trajectory, wherein the desired floor reaction force setting means sets a desired floor reaction force that turns a component in the vertical direction or a component in the direction perpendicular to a floor surface in a landing-on-floor period of the ground contacting portion to be positive, while the desired floor reaction force setting means sets a virtual desired floor reaction force that turns the component in the vertical direction or the component in the direction perpendicular to a floor surface in a leaving-from-floor period of the ground contacting portion to be negative on the basis of a desired floor reaction force immediately after landing, and the leg controlling means controls the motion of a leg on the basis of a corrected desired ground contacting portion trajectory determined by the desired ground contacting portion trajectory correcting means.

6. The legged mobile robot according to claim 3, comprising:

a mechanism deformation compensation amount setting means which sets a mechanism deformation compensation amount for compensating for an influence of a mechanism deformation amount exerted on a desired ground contacting portion trajectory on the basis of the mechanism deformation amount determined by the mechanism deformation amount determining means, wherein the desired ground contacting portion trajectory correcting means corrects the desired ground contacting portion trajectory set by the desired ground contacting portion setting means on the basis of a mechanism deformation compensation amount set by the mechanism deformation compensation amount setting means.

7. A legged mobile robot which has a base body, a plurality of legs extended downward from the base body, and a compliance mechanism for easing a landing impact to each leg, and which travels by motions of each leg, involving the landing and leaving of a ground contacting portion of a distal end of each leg onto and from a floor, comprising:

a desired gait setting means for setting a desired gait which has, as a desired ground contacting portion trajectory, a ground contacting portion trajectory in which a component of a velocity of a ground contacting portion in a vertical direction or a component thereof in a direction perpendicular to a floor surface becomes zero at leaving a floor and immediately before leaving from the floor and/or at landing on the floor and immediately after landing on the floor, and which satisfies a dynamic balance condition;

a corrected desired ground contacting portion trajectory setting means which sets, as a corrected desired ground contacting portion trajectory, a desired ground contacting portion trajectory that has been corrected such that a component of a velocity of a ground contacting portion in a vertical direction or a component thereof in a direction perpendicular to a floor surface does not become zero at leaving a floor and immediately before leaving the floor and/or at landing on the floor and immediately after landing on the floor; and a leg controlling means which controls the velocity of approaching of a ground contacting portion to a floor surface by operating a leg on the basis of a corrected desired ground contacting portion trajectory set by the corrected desired ground contacting portion trajectory setting means.

8. The legged mobile robot according to claim 7, comprising:

a desired ZMP setting means which sets a desired ZMP, wherein the desired gait setting means sets a desired gait by defining a condition, under which a motion of a desired gait satisfies a desired ZMP, as the dynamic balance condition.

9. A control program which imparts, to a computer mounted on the robot, a function for controlling a motion of a legged mobile robot, which has a base body, a plurality of legs extended downward from the base body, and a compliance mechanism for easing a landing impact to each leg, and which travels by motions of each leg, involving the landing and leaving of a ground contacting portion of a distal end of each leg onto and from a floor surface, the control program imparting:

a leg controlling function, which controls a motion of a leg such that a ground contacting portion lands onto a floor at a predetermined velocity in a vertical direction downward or in a direction perpendicular to the floor surface downward, to the computer mounted on the robot, wherein the control program imparts, to a computer mounted on the robot, a desired floor reaction force setting function for setting a desired value of a floor reaction force acting on the ground contacting portion as a desired floor reaction force; and as a leg controlling function, a function for determining the predetermined velocity on the basis of a change rate of the amount of deformation of the compliance mechanism in the vertical direction or the direction perpendicular to the floor surface, which occurs immediately after the landing of the ground contacting portion of the leg due to the desired floor reaction force set by the desired floor reaction force setting function, and for controlling a motion of the leg such that the velocity of the ground contacting portion in the vertical direction downward or the direction perpendicular to the floor surface downward reaches the determined predetermined velocity by the landing, to the computer mounted on the robot.

10. The control program according to claim 9, which imparts, to a computer mounted on the robot, as the leg controlling function, a function for controlling a motion of a leg such that the predetermined velocity takes a ratio falling within a range of [0.1, 10] relative to the absolute value of a change rate of the amount of deformation of the compliance mechanism in the vertical direction or the direction perpendicular to the floor surface, which occurs immediately after the landing of the ground contacting portion of the leg due to the desired floor reaction force set by the desired floor reaction force setting function, to the computer mounted on the robot.

11. The control program according to claim 9, which imparts to a computer mounted on the robot:

a mechanism deformation amount determining function for determining the amount of deformation of a compliance mechanism occurring due to a desired floor reaction force set by the desired floor reaction force setting function as a mechanism deformation amount;

a desired ground contacting portion trajectory setting function for setting a desired position of a ground contacting portion of a leg as a desired ground contacting portion trajectory; and a desired ground contacting portion trajectory correcting function for correcting the desired ground contacting portion trajectory set by the desired ground contacting portion trajectory setting function so as to compensate for an influence of a mechanism deformation amount determined by the mechanism deformation amount determining function exerted on the desired ground contacting portion trajectory, and also imparts:

as the leg controlling function, a function for controlling a motion of a leg such that the velocity of the ground contacting portion in the vertical direction downward or the direction perpendicular to the floor surface downward reaches a predetermined velocity by the landing on the basis of a change rate of a component of a mechanism deformation amount in the vertical direction or a component thereof in the direction perpendicular to the floor surface immediately after the landing of the ground contacting portion determined by the mechanism deformation amount determining function in a leaving-from-floor period of the ground contacting portion, and for controlling a motion of a leg on the basis of a corrected desired ground contacting portion trajectory provided by a desired ground contacting portion trajectory correcting function in a landing-on-floor period of the ground contacting portion, to the computer mounted on the robot.

12. The control program according to claim 11, which imparts, as a desired ground contacting portion trajectory correcting function, a function for correcting a component of a desired ground contacting portion trajectory in the vertical direction or a component thereof in the direction perpendicular to a floor surface, the desired ground contacting portion trajectory having been set by the desired ground contacting portion trajectory setting function, such that the component is shifted upward on the basis of a mechanism deformation amount immediately after the ground contacting portion lands, which has been determined by the mechanism deformation amount determining function, in a leaving-from-floor period of the ground contacting portion, while the component is shifted downward on the basis of a mechanism deformation amount set by the mechanism deformation amount determining function in a landing-on-floor period of the ground contacting portion to a computer mounted on the robot.

13. The control program according to claim 11, which imparts, to a computer mounted on the robot:
   a mechanism deformation amount determining function for determining the amount of deformation of the compliance mechanism occurring due to a desired floor reaction force set by the desired floor reaction force setting function as a mechanism deformation amount;
   a desired ground contacting portion trajectory setting function for setting a desired position of a ground contacting portion of a leg as a desired ground contacting portion trajectory; and
   a desired ground contacting portion trajectory correcting function for determining a corrected desired ground contacting portion trajectory by correcting a desired ground contacting portion trajectory set by the desired ground contacting portion trajectory setting function so as to compensate for an influence of a mechanism deformation amount determined by the mechanism deformation amount determining function exerted on the desired ground contacting portion trajectory,
   imparts to the computer, as a desired floor reaction force setting function, a function for setting a desired floor reaction force that turns a component in the vertical direction or a component in the direction perpendicular to a floor surface in a landing-on-floor period of the ground contacting portion to be positive, while setting a virtual desired floor reaction force that turns the component in the vertical direction or the component in the direction perpendicular to a floor surface in a leaving-from-floor period of the ground contacting portion to be negative on the basis of a desired floor reaction force obtained immediately after landing, and
   imparts to the computer, as a leg controlling function, a function for controlling a motion of a leg on the basis of a corrected desired ground contacting portion trajectory determined by the desired ground contacting portion trajectory correcting function.

14. The control program according to claim 11, which imparts, to a computer mounted on the robot:
   a mechanism deformation compensation amount setting function for setting a mechanism deformation compensation amount for compensating for an influence of a mechanism deformation amount exerted on a desired ground contacting portion trajectory on the basis of a mechanism deformation amount determined by the mechanism deformation amount determining function; and also imparts, to a computer mounted on the robot:
   as a desired ground contacting portion trajectory correcting function, a function for correcting the desired ground contacting portion trajectory set by the desired ground contacting portion setting function on the basis of a mechanism deformation compensation amount set by the mechanism deformation compensation amount setting function.

15. A control program which imparts a function for controlling a motion of a legged mobile robot having a base body, a plurality of legs extended downward from the base body, and a compliance mechanism for easing a landing impact to each leg, and which travels by motions of each leg, involving the landing and leaving of a ground contacting portion of a distal end of each leg onto and from a floor, to a computer mounted on the robot, the control program imparting:
   a desired gait setting function for setting a desired gait which has, as a desired ground contacting portion trajectory, a ground contacting portion trajectory in which a component of a velocity of a ground contacting portion in a vertical direction or a component thereof in a direction perpendicular to a floor surface becomes zero at leaving a floor and immediately before leaving the floor and/or at landing and immediately after landing, and which satisfies a dynamic balance condition;
   a corrected desired ground contacting portion trajectory setting function which sets, as a corrected desired ground contacting portion trajectory, a desired ground contacting portion trajectory that has been corrected such that a component of a velocity of a ground contacting portion in a vertical direction or a component thereof in a direction perpendicular to a floor surface does not become zero at leaving a floor and immediately before leaving the floor and/or at landing and immediately after landing; and
   a leg controlling function for controlling the velocity of approaching of a ground contacting portion to a floor surface by operating a leg on the basis of a corrected desired ground contacting portion trajectory set by the corrected desired ground contacting portion trajectory setting function.

16. The control program according to claim 15, which imparts a desired ZMP setting function for setting a desired ZMP to a computer mounted on the robot, and also imparts, as a desired gait setting function, a function for setting a desired gait by defining a condition, under which a motion of a desired gait satisfies a desired ZMP, as the dynamic balance condition, to a computer mounted on the robot.

17. The legged mobile robot according to claim 4, comprising:
a mechanism deformation compensation amount setting means which sets a mechanism deformation compensation amount for compensating for an influence of a mechanism deformation amount exerted on a desired ground contacting portion trajectory on the basis of the mechanism deformation amount determined by the mechanism deformation amount determining means,
wherein the desired ground contacting portion trajectory correcting means corrects the desired ground contacting portion trajectory set by the desired ground contacting portion setting means on the basis of a mechanism deformation compensation amount set by the mechanism deformation compensation amount setting means.

18. The legged mobile robot according to claim 5, comprising:
a mechanism deformation compensation amount setting means which sets a mechanism deformation compensation amount for compensating for an influence of a mechanism deformation amount exerted on a desired ground contacting portion trajectory on the basis of the mechanism deformation amount determined by the mechanism deformation amount determining means,
wherein the desired ground contacting portion trajectory correcting means corrects the desired ground contacting portion trajectory set by the desired ground contacting portion setting means on the basis of a mechanism deformation compensation amount set by the mechanism deformation compensation amount setting means.

19. The control program according to claim 12, which imparts, to a computer mounted on the robot:
a mechanism deformation compensation amount setting function for setting a mechanism deformation compensation amount for compensating for an influence of a mechanism deformation amount exerted on a desired ground contacting portion trajectory on the basis of a mechanism deformation amount determined by the mechanism deformation amount determining function; and also imparts, to a computer mounted on the robot:
as a desired ground contacting portion trajectory correcting function, a function for correcting the desired ground contacting portion trajectory set by the desired ground contacting portion setting function on the basis of a mechanism deformation compensation amount set by the mechanism deformation compensation amount setting function.

20. The control program according to claim 13, which imparts, to a computer mounted on the robot:
a mechanism deformation compensation amount setting function for setting a mechanism deformation compensation amount for compensating for an influence of a mechanism deformation amount exerted on a desired ground contacting portion trajectory on the basis of a mechanism deformation amount determined by the mechanism deformation amount determining function; and also imparts, to a computer mounted on the robot:
as a desired ground contacting portion trajectory correcting function, a function for correcting the desired ground contacting portion trajectory set by the desired ground contacting portion setting function on the basis of a mechanism deformation compensation amount set by the mechanism deformation compensation amount setting function.

* * * * *